US012766773B2

(12) United States Patent
Darling et al.

(10) Patent No.: US 12,766,773 B2
(45) Date of Patent: Oct. 20, 2026

(54) CONSTRUCTION COMPONENTS AND SYSTEMS FABRICATED USING EXTRUDED MATERIALS

(71) Applicant: Not Wood Inc., Phoenix, AZ (US)

(72) Inventors: Jordan Darling, Paradise Valley, AZ (US); Shane Louis Kenyon, Mesa, AZ (US)

(73) Assignee: Not Wood, Inc., Phoenix, AZ (US)

( * ) Notice: Subject to any disclaimer, the term of this patent is extended or adjusted under 35 U.S.C. 154(b) by 126 days.

(21) Appl. No.: 18/139,792

(22) Filed: Apr. 26, 2023

(65) Prior Publication Data

US 2023/0347567 A1 Nov. 2, 2023

Related U.S. Application Data

(60) Provisional application No. 63/335,549, filed on Apr. 27, 2022.

(51) Int. Cl.

| | |
|---|---|
| ***B29C 48/11*** | (2019.01) |
| ***B29C 48/00*** | (2019.01) |
| ***B29C 48/07*** | (2019.01) |
| ***E04C 2/22*** | (2006.01) |
| ***E04C 2/34*** | (2006.01) |
| ***E04C 2/38*** | (2006.01) |
| *B29L 31/00* | (2006.01) |

(Continued)

(52) U.S. Cl.

CPC .......... *B29C 48/11* (2019.02); *B29C 48/0012* (2019.02); *B29C 48/002* (2019.02); *B29C 48/0022* (2019.02); *B29C 48/07* (2019.02); *E04C 2/22* (2013.01); *E04C 2/3405* (2013.01); *E04C 2/388* (2013.01); *B29L 2031/10* (2013.01); *B29L 2031/776* (2013.01); *E04C 2002/001* (2013.01)

(58) Field of Classification Search

CPC ... B29C 48/11; B29C 48/0012; B29C 48/002; B29C 48/0022; B29C 48/07; B29C 48/0011; B29C 48/0021; B29C 48/08; B29C 48/154; B29C 48/21; B29C 48/305; B29C 48/12; E04C 2/22; E04C 2/3405; E04C 2/388; E04C 2002/001; B29L 2031/10; B29L 2031/776

See application file for complete search history.

(56) References Cited

U.S. PATENT DOCUMENTS

| | | | |
|---|---|---|---|
| 2,518,164 | A | 8/1950 | Meyer |
| 3,356,555 | A | 12/1967 | Jackson |
| 4,346,541 | A | 8/1982 | Schmitt |

(Continued)

FOREIGN PATENT DOCUMENTS

WO WO-2017220540 A1 * 12/2017 ............. B27N 3/007

OTHER PUBLICATIONS

ISA; International Search Report and Written Opinion dated Sep. 19, 2023 in PCT/US2023/020110.

*Primary Examiner* — Abbas Rashid
*Assistant Examiner* — Adrianna N Konves
(74) *Attorney, Agent, or Firm* — Snell & Wilmer L.L.P.

(57) ABSTRACT

Construction components and systems fabricated using extruded materials are disclosed. A particular embodiment includes: a sheet fabricated from an extruded material; and a core structure internal to the sheet, the core structure including voids, the voids being triangular-shaped and arranged in an alternately inverted pattern.

12 Claims, 38 Drawing Sheets

(51) Int. Cl.
*B29L 31/10* (2006.01)
*E04C 2/00* (2006.01)

(56) References Cited

U.S. PATENT DOCUMENTS

| | | | |
|---|---|---|---|
| 4,633,634 | A | 1/1987 | Nemmer |
| 4,948,653 | A | 8/1990 | Dinter et al. |
| 5,367,844 | A | 11/1994 | Diedrich |
| 5,735,986 | A | 4/1998 | Fell |
| 5,792,487 | A | 8/1998 | Wenning |
| 5,870,287 | A | 2/1999 | Rodriguez et al. |
| 6,224,701 | B1 | 5/2001 | Bryant |
| 6,854,230 | B2 | 2/2005 | Starke |
| 6,890,637 | B2 | 5/2005 | Baker |
| 7,930,861 | B2 | 4/2011 | Schiffmann |
| 8,381,454 | B1 | 2/2013 | Robinson |
| 8,726,594 | B2 | 5/2014 | Salazar |
| 8,757,704 | B2 | 6/2014 | Zhao |
| 9,422,423 | B2 | 8/2016 | Nosker |
| 10,633,859 | B2 | 4/2020 | Grimsson |
| 2005/0034401 | A1 | 2/2005 | Sutelan |
| 2006/0187411 | A1 | 8/2006 | Boulineau et al. |
| 2007/0256379 | A1 | 11/2007 | Edwards |
| 2009/0056257 | A1 | 3/2009 | Mollinger et al. |
| 2009/0169855 | A1 | 7/2009 | Tunis |
| 2011/0262736 | A1 | 10/2011 | Sumi |
| 2014/0154349 | A1 | 6/2014 | Nosker |
| 2016/0114541 | A1 | 4/2016 | Bressan |
| 2017/0361521 | A1* | 12/2017 | Wang ...................... B32B 38/06 |
| 2019/0055731 | A1 | 2/2019 | Nasibov |
| 2020/0254433 | A1* | 8/2020 | Halder .................. F01N 3/0222 |

* cited by examiner

Top Down View

Side View

CONSTRUCTION COMPONENTS AND SYSTEMS FABRICATED USING EXTRUDED MATERIALS

PRIORITY PATENT APPLICATION

This non-provisional patent application draws priority from U.S. provisional patent application Ser. No. 63/335,549; filed Apr. 27, 2022. This present non-provisional patent application draws priority from the referenced patent application. The entire disclosure of the referenced patent application is considered part of the disclosure of the present application and is hereby incorporated by reference herein in its entirety.

TECHNICAL FIELD

This patent application relates to construction or building materials, according to example embodiments, and more specifically to construction components and systems fabricated using extruded materials.

COPYRIGHT

A portion of the disclosure in this patent document contains material that is subject to copyright protection. The copyright owner has no objection to the facsimile reproduction of the patent document or the patent disclosure, as it appears in the U.S. Patent and Trademark Office patent files or records, but otherwise reserves all copyright rights whatsoever. The following notice applies to the disclosure herein and to the drawings that form a part of this document:

Copyright 2021-2023 Not Wood Inc., All Rights Reserved.

BACKGROUND

The building and construction industry has many use cases for using panels to build walls, roofs, flooring, forms, etc. Typical sheathing products are configured in standard sizes, most traditionally 4' widths by 8' lengths with varying thicknesses ⅜", ½", ¾" to name a few. In these instances, the geometrical limitations are a bounding box of what can be accomplished in the given form factor. In this case, product improvements or additions beyond the base materials, are exactly that, add-ons or violations of the bounding box. Any alteration to the solid, rectangular or square volume of material requires additional post-processing, that is limited in consistency, and reduces performance (potentially requiring the removal of material). The solid volume also creates limitations for additional applications where modularity, or co-mingling of multiple products into assemblies relies on permanent alterations or techniques that damage the product from being used in a separate use—the given bounding box is subjected purely to filling the volume with material.

Many of these typical options have very intensive processes to create an end product. These processes create many input variables where the performance characteristics in all aspects (visual, mechanical, chemical, manufacturing, dimensional, etc.) can vary greatly. The materials used are also inherently susceptible to the environment to which they are exposed, leading to a highly sensitive operating window influenced by many uncontrollable external factors.

The conventional methods used to achieve material performance rely on the binding agent, namely adhesives. While these conventional binding agents offer added material characteristics, the detriments include off-gassing and reactions to environmental effects. Additionally, because of the nature of the adhesive material mixtures, an added layer of complexity is required for recycling these materials, if recycling is even possible. In many instances, the conventional construction products never see another life outside of landfills.

Moreover, in typical construction materials, the moisture absorption is very high. When moisture content in these construction materials reaches a certain threshold, there is significant degradation. These exposure risks can cause negative effects, including: delamination, rotting, mold, warping or expansion (in all dimensions), contamination (to other panels, building materials, and framing), and decreased service life. As such, conventional construction materials, particularly sheathing materials, are not readily adaptable, cannot be re-used, and cannot be recycled. Better construction materials are needed.

SUMMARY

Construction components and systems fabricated using extruded materials are disclosed. In example embodiments, there are disclosed herein products that include extruded sheathing products of new materials and processes that allow multiple product formats. The core of the disclosure herein contains information describing how the disclosed extruded construction materials are created, manufactured, and used. The main process includes extruding recycled materials or partially recycled materials into a sheet or sheathing in a continuous process, with and/or without a secondary composite layer depending on the use case. Also disclosed are additional products and use cases of the products combined in various methods to define different approaches to building-related applications, including but not limited to, flooring, walls, roofing, and other applications for paneling, sheathing, and/or decking.

The example embodiments disclosed herein can include a single material extruded hollow core board. The single material extruded hollow core board disclosed herein is fabricated from a material composition, such as reinforced recycled plastic, with a high degree of performance, such that a cap layer is not needed as a strengthening component. Nevertheless, alternative embodiments of the disclosed construction materials can still be fabricated with cap layers in a co-extrusion process.

Additionally, the example embodiments disclosed herein include systems and methods for producing a deck board with a similar core structure and material as the disclosed single material extruded hollow core board. In particular, the deck board of an example embodiment can be fabricated as a 1" tall×6" wide bounding box. This deck board can have a cap layer, co-extruded around the core material. The cap layer can contain additives for ultra-violet (UV) protection, dyes for color, texturing, and the like. The extruded deck board can be "roller pressed" to achieve a wood grain texture or other desired texture as disclosed herein. Details of example embodiments of the disclosed construction components and systems fabricated using extruded materials are provided below.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

Figure 1:
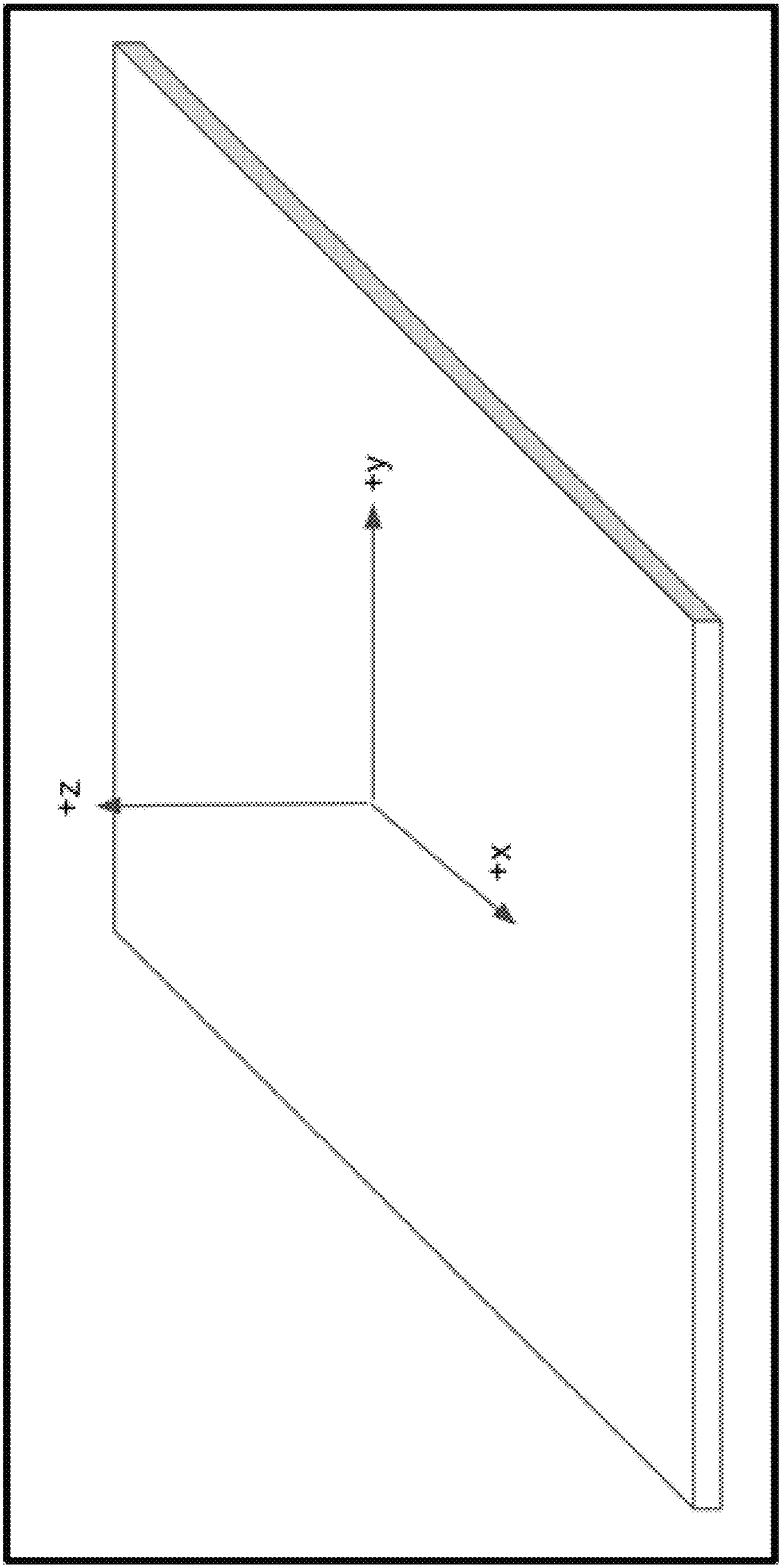
FIG. 1 illustrates an example embodiment of a construction panel fabricated from an extruded recycled material as described herein.

In the various embodiments described herein, construction components and systems fabricated using extruded materials are disclosed. Referring to FIG. 1, an example embodiment of a construction panel fabricated from an extruded recycled material as described herein is illustrated. For document reference, an extruded sheet can be referenced in the X-direction. The "standard" 4'×8' sheet can be considered a 4' (Y-direction) and 8' (X-direction) sheet. Sheet thickness (or height) can be referenced in the Z-direction. For modeling purposes, a global coordinate system (0, 0, 0) can be located at the Center-of-Gravity of the sheet, creating symmetrical measurements in all directions.

In the disclosure provided herein, the following nomenclature is used:

Extrusion
- The process in which material is forced through a die into final shape.

Co-Extrusion
- An extrusion process that can involve multiple extrusion dies, multiple materials, and multiple processes combined.

In the various embodiments described herein, different types of construction materials can be fabricated from extruded recycled materials using the methods disclosed herein. The extruded construction materials can be used in a variety of different applications or use cases, such as building construction, marine applications, motorhomes, recreational vehicles, trailers, and the like. These different types of extruded construction materials can include the following:

1. A Standard Extruded Panel or Sheet
   - The standard panel can be 4'×8', with a standard thickness (e.g., ¼, ½, ¾ etc.).
   - The standard panel can be cut to size, with a single material.
   - The standard panel can be cut to size, with a single material, with a desired extruded material thickness.
2. A High-Performance Extruded Panel or Sheet
   - The high-performance panel can be 4'×8', with a standard thickness (e.g., ¼, ½, ¾, etc.).
   - The high-performance panel can be cut to size, with a single material or multiple types of materials, offering an option that can meet or exceed standards.
3. Modular Extruded Construction Materials
   - A step beyond a sheet or engineered sheet board, the Modular Extruded Construction Materials can contain additional components either integrated, or engineered to be integrated into the board as applicable in,
     - i. Roofing
     - ii. Flooring
     - iii. Wall Sheathing
     - iv. Concrete Forming
     - v. Decking
   - An example is a roof board with integrated fastening slots for solar panels.

These product options are discussed in more detail below.

4. The All-in-One Extruded Construction Materials
   - The various embodiments disclosed herein provide the product options beyond a sheet, engineered sheet, and modular materials to offer fully integrated boards as applicable in,
     - i. Roofing
     - ii. Flooring
     - iii. Wall Sheathing
     - iv. Concrete Forming
     - v. Decking
   - An example is a roof board that contains all traditional roof components built into the board (underlayment, shingles, water barrier, etc.) where the product simply has to be fastened to the framing to be finished. In other embodiments, the techniques employed for the fabrication of roofing boards as described herein can also be used for a variety of different styles and form factors. In general, the disclosed techniques can be used to combine a plurality of layers (e.g., three to four) into a single form factor. These product options are discussed in more detail below.
5. Miscellaneous Building Materials & Components
   - Seam Tape engineered for extruded material products.
     - i. Specialized tape that is engineered to bond to extruded material products while maintaining traditional performance requirements.
   - Nails, Screws, Inserts engineered for extruded material products.
     - i. Specialized fasteners that do not exist in the market that allow the use of various combinations and modifications of extruded material products.
   - Shingles, Tiles, Gutters engineered for extruded material for roofing, sheathing, and subfloor.
     - i. Specialized "A-Class" paneling that is designed to integrate with extruded material boards and meet extruded material design requirements and styling.

Figure 2:
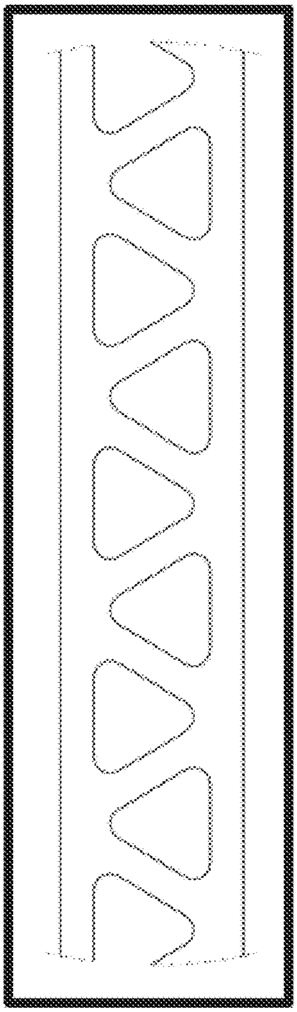
FIGS. 2 and 3 illustrate example embodiments of cross section views of a core structure of a construction panel fabricated from an extruded recycled material.

In the various example embodiments described herein, different types of construction materials can be fabricated from extruded recycled materials with a core structure as disclosed herein. The core structure in this instance refers to the main cross section of the sheet, as extruded. One important purpose of the core structure options described herein is to remove material (and therefore mass) to meet mass targets and become more structurally mass efficient. In addition, the different core structures described enable a variety of additional building, assembly, safety, etc. features to be implemented with the extruded material products, which are not possible with a solid cross section conventional board. In various example embodiments, the cross sections implemented with the extruded material products can include, but are not limited to the following:

Truss (See FIG. 2 for an example embodiment)
- Conventional truss design—In particular embodiments described herein, the cross section or core can be configured with voids being triangular-shaped and arranged in an alternately inverted pattern (See FIG. 2).
- Natural drain/trough structure, in certain applications.

Figure 3:
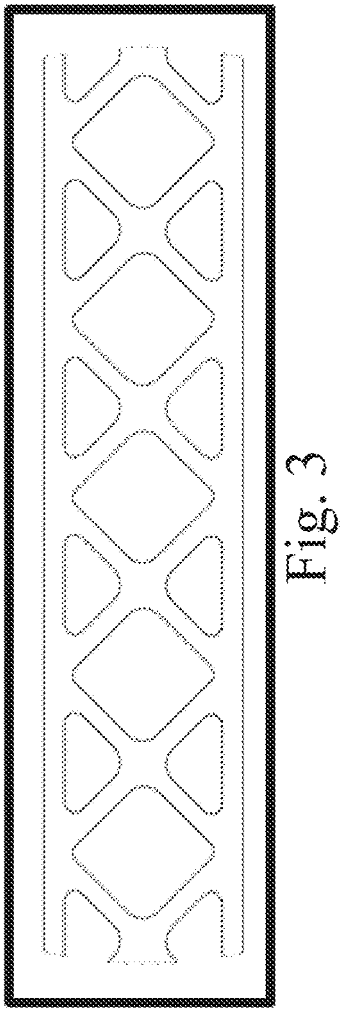

"X" Shaped Core (See FIG. 3 for an example embodiment)
- Enables certain locking features board to board, board to end cap, board to other components. In particular embodiments described herein, the cross section or core can be configured with X-shaped structure elements creating triangular and diamond-shaped voids therebetween (See FIG. 3).

Shape Design
- An AI-Optimized cross section based on all input loads and functional requirements.
- Most mass efficient.

Lattice Rib
- Further optimization within a micro-structure of beam elements.

In an example embodiment of the engineered extruded panel or sheet described above, the engineered material structure can include, but is not limited to, a core structure plus an additional engineered layer or layers allowing the combined component to meet or exceed typical construction material standards along with the added benefits of a cap layer material. Several examples are described below.

Figure 4:
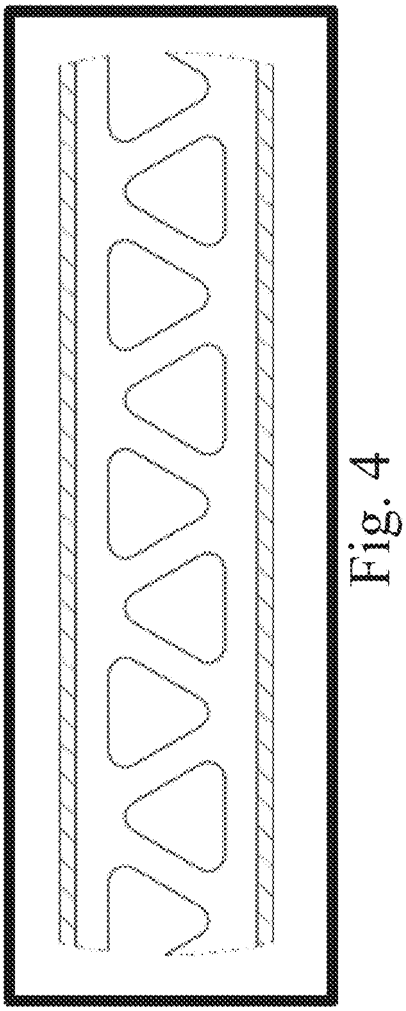
FIG. 4 illustrates an example embodiment of cross section view of a core structure of a construction panel with a cap layer, wherein the construction panel is fabricated from an extruded recycled material.

Truss Plus Cap Layer (See FIG. 4 for an example embodiment)

Cross section shows an example of a truss core structure plus two edge cap layers "X" Shaped Core Plus Cap Layer Shape Design Plus Cap Layer Lattice Rib Plus Cap Layer In the various embodiments described herein, different types of construction materials can be fabricated from extruded recycled materials using the manufacturing methods disclosed herein. These different types of manufacturing methods can include the following:

Extrusion

In this instance, the core structure is extruded in an X direction in a continuous cross section. This allows for a standard width product (4' or as specified) as well as easily adjustable length (standard of 8').

Co-Extrusion

Similar to extrusion, with the ability to add in other materials, other cross sections, and any combination of those methods.

Extrusion plus Press

This process ensures the mechanical/structural integrity between the two (or more) different materials and processes coming together to make one board. Some options to achieve an engineered sheet with extrusion plus press are described below.

Figure 5:
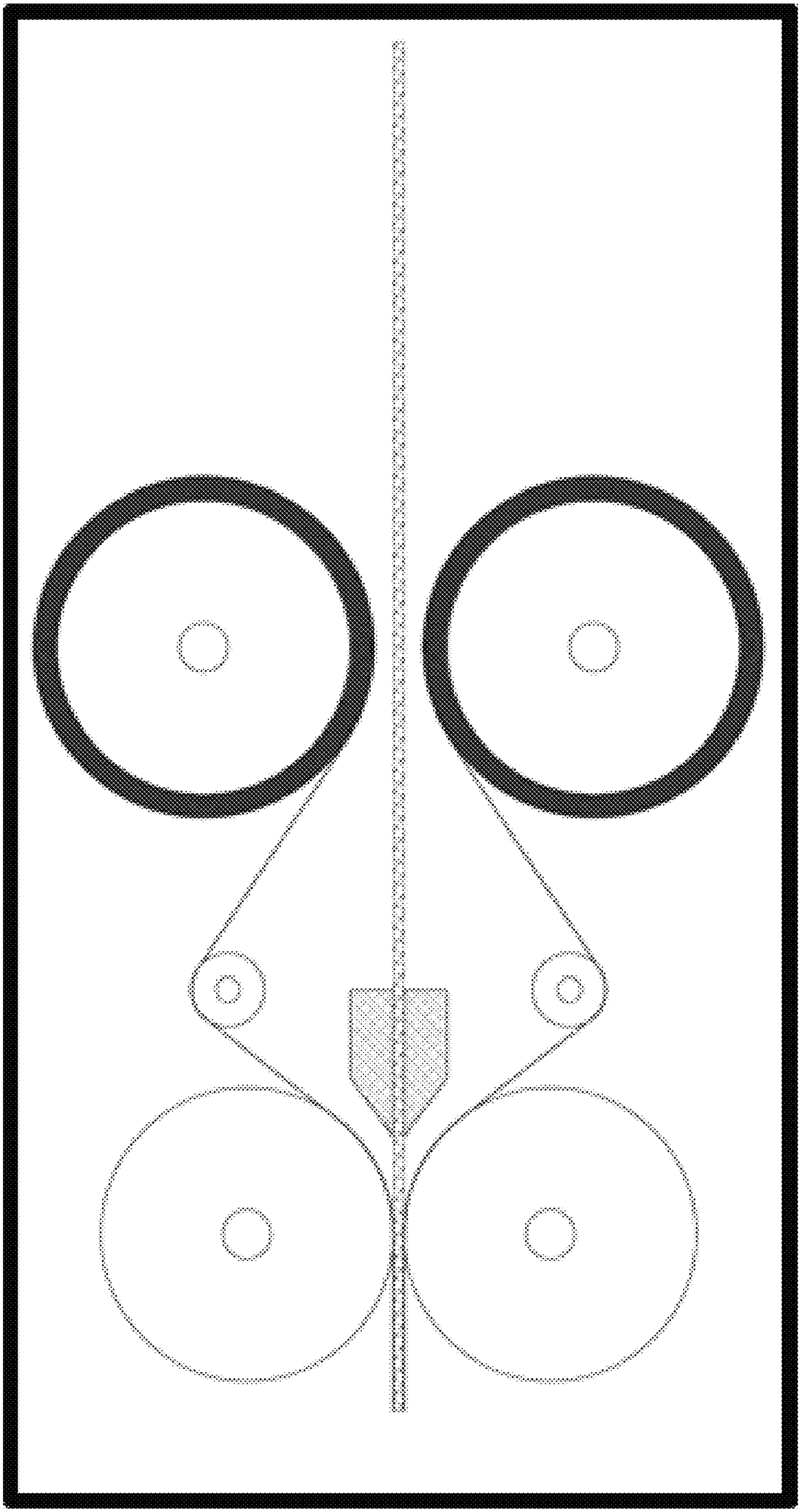
FIG. 5 illustrates an example embodiment of an extrusion plus roll pressing apparatus.

Extrusion plus Roll Pressing (See FIG. 5 for an example embodiment)

With the core material being extruded out of the die, two rollers, one on top and one on the bottom compress the plastic extrusion as it comes out of the die.

Both rollers can be fed a sheet of reinforcement material, which can be hemp, fiberglass, rope, etc. The reinforcement material is wetted with resin or pre-soaked as a pre-preg.

This reinforcement material is pressed into the hot plastic as it comes out of the extrusion die. As the plastic exits the other side of the rollers the reinforcement material is compressed within the core plastic extrusion and the resin can begin to cool/activate within the plastic.

Figure 6:
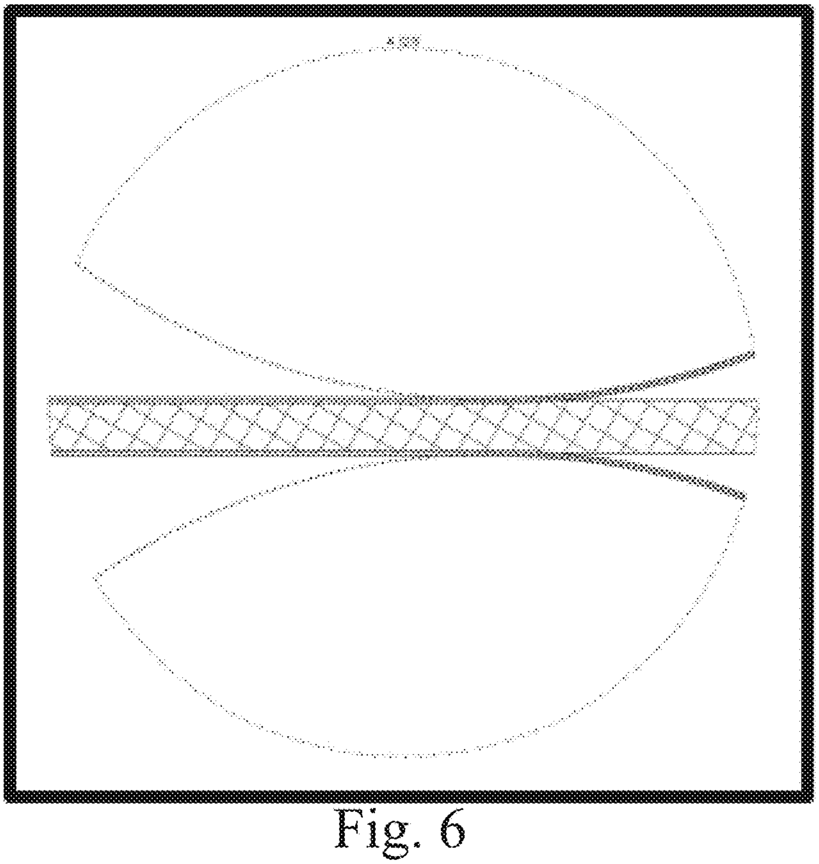
FIG. 6 illustrates an example showing the extruded core being pressed with an additional reinforcement layer by two rollers, post extrusion.

FIG. 6 illustrates an example showing the extruded core being pressed with an additional reinforcement layer by two rollers, post extrusion.

With roller control, heat control, and feed rate control, the compression of the core structure coming out of the die can be controlled to vary overall final thickness, as well as bond strength to core structure.

Cap layer can be multi material/layer.

Figure 7:
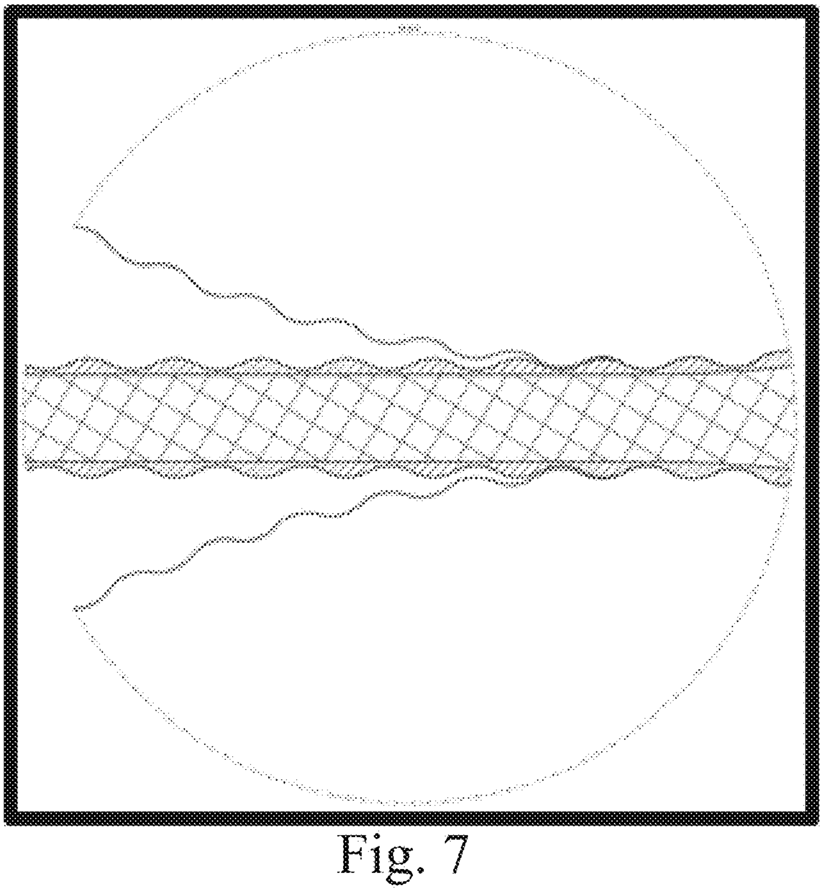
FIG. 7 illustrates an example showing how rollers can be patterned in the Y direction, and/or X direction to form a pattern into the extruded sheet.

FIG. 7 illustrates an example showing how rollers can be patterned in the Y direction, and/or X direction to form a pattern into the extruded sheet. An extra locking feature can also be provided for the cap layer to grab. This is an example of a textured roller, rolling in the X direction (XZ Section Plane) allowing for a textured extrusion.

Figure 8:
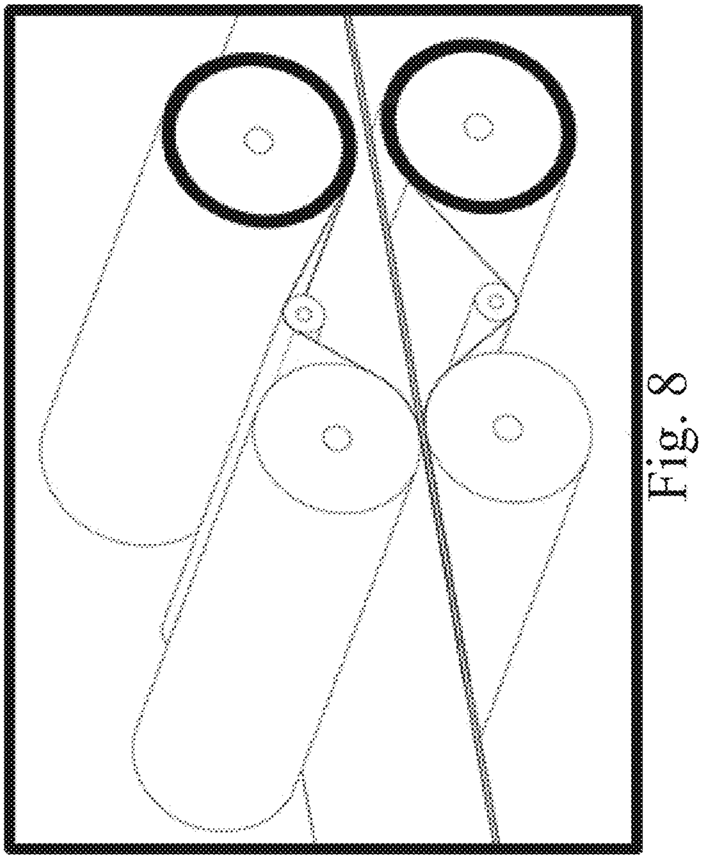
FIG. 8 illustrates an example showing an ISO-view of an example extrusion plus roller layer application.

Some examples of use cases for a textured extrusion can include but are not limited to, the following:

1. Anti-Slip
   a. For safety for workers standing on a roof
   b. For board to board slip prevention
   c. For positional purposes
2. Cutting & Trimming Marks
3. Snow Catch
4. Water Catch
5. Fastening Marks
6. Pre-Manufactured Element Integration
7. Bonding Path
8. Air-Gap FIG. 8 illustrates an example showing an ISO-view of an example extrusion plus roller layer application.

Figure 9:
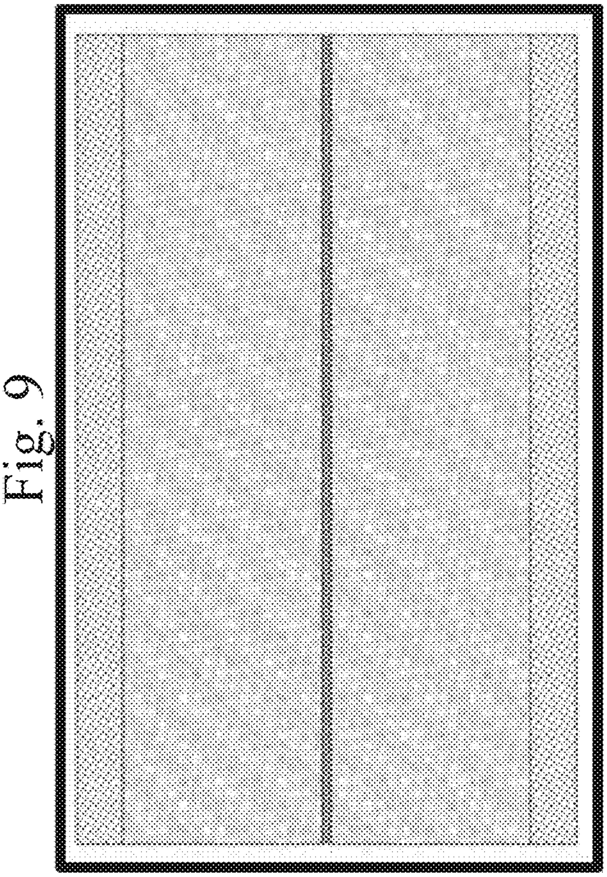
FIG. 9 illustrates an example showing a front view of the rollers.

FIG. 9 illustrates an example showing a front view of the rollers.

Textured roller can provide cross sectional shape differences in the YZ Section Plane.

Figure 10:
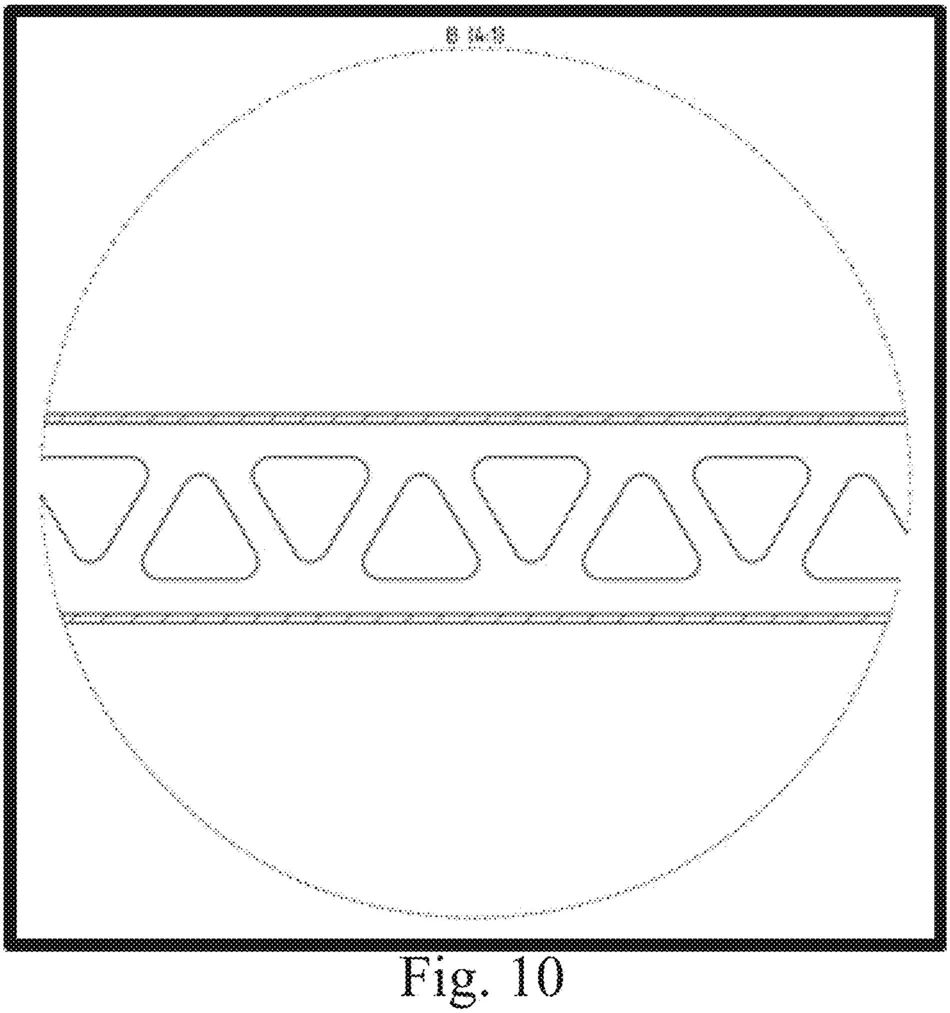
FIG. 10 illustrates an example showing an XZ Section Plane cut of a core structure plus a cap layer.

FIG. 10 illustrates an example showing an XZ Section Plane cut of a core structure plus a cap layer.

Figure 11:
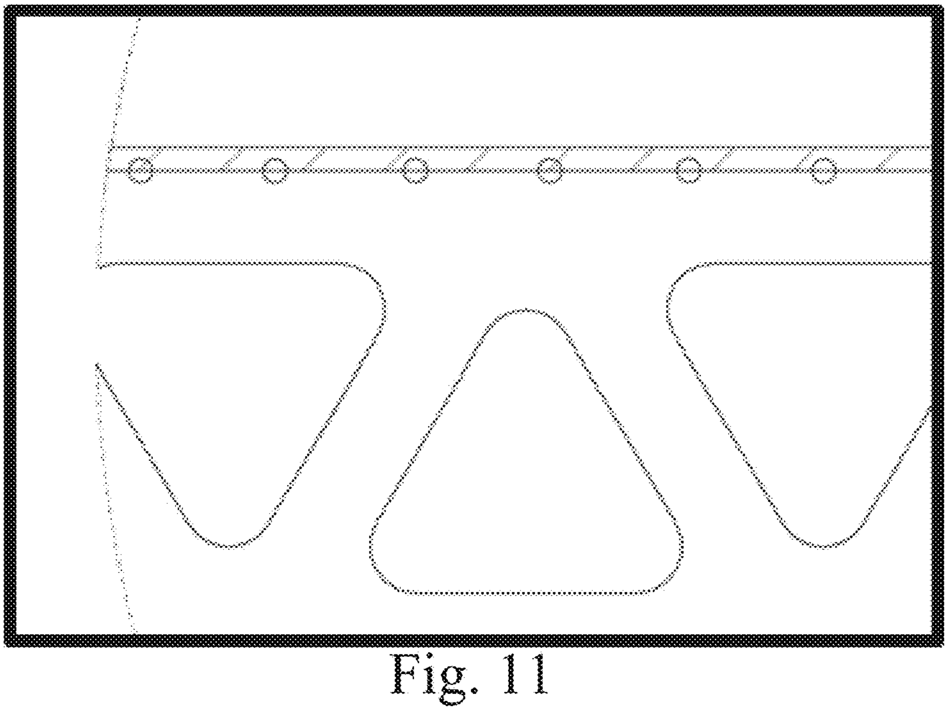
FIG. 11 illustrates an example showing a cross section with a cord layer pressed into a core structure and cap layer.

FIG. 11 illustrates an example showing a cross section with a cord layer pressed into a core structure and cap layer. The cord layer can be co-extruded into the core structure or the cap layer (i.e., does not have to be at material interface). The cord layer can vary in shape and size depending on loads, material availability, customer specifications, etc.

Figure 12:
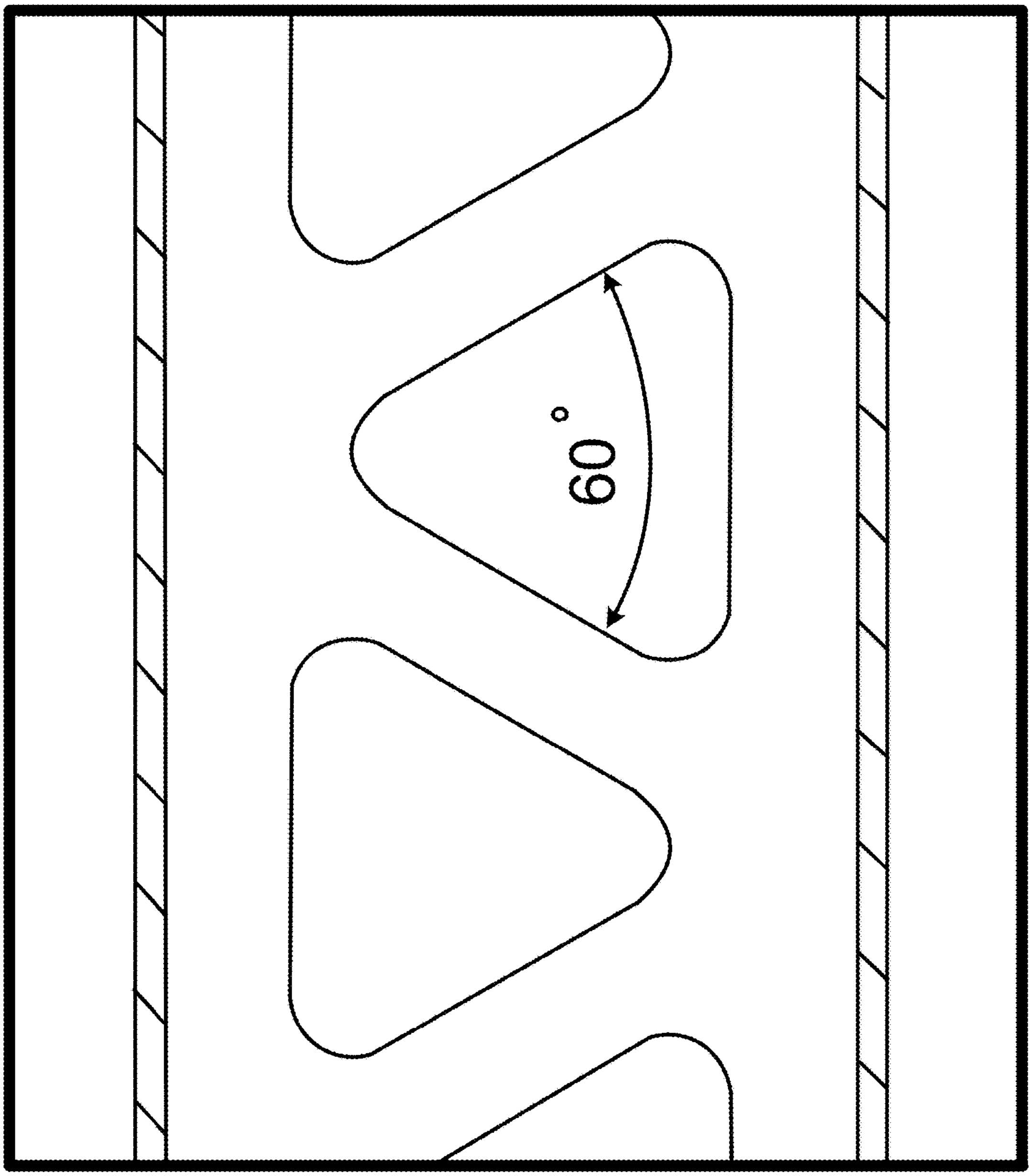
FIG. 12 illustrates an example section of truss structure detailing the thickness and truss angle of an example embodiment.

FIG. 12 illustrates an example section of truss structure detailing the thickness and truss angle of an example embodiment. Parameters can be fine-tuned for specific applications based on weight, performance, etc. In any instance, the core structure does not need a symmetrical truss pattern and can vary if needed. Truss core structures can be triangular, X-shaped, hex-shaped, octagon-shaped, etc. The internal truss structure provides good performance while maintaining symmetrical, alternately inverted, equilateral triangles, and while providing enough empty space to add features within the core voids. The symmetrical/equilateral internal truss structure helps create consistency in the tooling and manufacturing, along with enabling more options for accessory clip features. The radius/fillets of the triangles of the internal truss structure help create more uniform material flow into each rib, and reduces stress at those intersection points. The X-shaped structure elements creating triangular and diamond-shaped voids therebetween are also a good performance internal truss structure. Truss core structures can have a "self-centering" nail or fastener capability if used in conjunction with a fastening slot locator. The inverted "V" will naturally deflect a nail or screw to automatically align in the same location every time.

Extrusion Plus Mold Pressing

Similar in concept to roll pressing with the difference that any additional material added to the core structure becomes pressed into the core, post extrusion. This can be a scenario where the cap layer or extra material is unable to be rolled into the core structure.

Extrusion Plus Foaming

In this instance, the end product would contain a foam structure in parts or all of the voided volume of the core structure. The method for foaming can be during extrusion, post extrusion, or pre-extrusion. Examples can include the following:

Pre-Extrusion

A prefabricated foam structure is co-extruded with the core structure.

During Extrusion

The foam can be injected into the die as the extrusion occurs, expanding to fill the void as the extrusion cools exiting the die.

Post Extrusion

The foam can be injected or inserted (pre-fabricated structure) after the sheet is extruded and cooled. This can be in the manufacturing plant, or at the jobsite during construction or during repair.

Extrusion Plus Tubing/Heat Core/Wiring/etc.

In this instance, similar to the foam structure, the core structure can contain in the voided volume—tubing, heating core elements, electrical wiring, etc. (a pre-manufactured element). Also similar to the foam process, this can occur pre-extrusion, during extrusion and post extrusion. This could differentiate from the foaming process in that depending on the cross section and material composition, the plastic extrusion can completely encapsulate the pre-manufactured element.

Pre-Extrusion

A pre-manufactured element is co-extruded with the core structure.

During Extrusion

The pre-manufactured element is injected/fed into the die as the extrusion occurs, filling the void as the extrusion cools exiting the die.

Post Extrusion

The pre-manufactured element is injected or inserted (pre-fabricated structure) after the sheet is extruded and cooled. This can be in the manufacturing plant, or at the jobsite during construction or during repair.

In the various example embodiments described herein, different types of raw materials can be used to fabricate the extruded construction materials as disclosed herein. The materials described below are some options and examples of the types of materials that can be extruded for both the core structure and the engineered cap layer of the construction materials disclosed herein. The core structure and cap layer material can be adjusted for material specific requirements such as recyclable content, environmental performance, or even mating material compatibility.

In an example embodiment, the raw material for extrusion can be a base single material. If the cap layer can bond to the core material, this feature allows for a variety of options of plastics, metals, etc.

In an example embodiment, the raw material for extrusion can be a recycled material. If the cap layer can bond to the core material, this feature allows for a variety of options of recycled materials. Options can include "clean" single material recycled content. Other options can include a process to combine and melt different types of recycle streams into one mixed-multi-material end product. The composition of the extruded recycled material can be adjusted based on the incoming material stream because of different locations, different recycling streams, etc.

In an example embodiment, the raw material for extrusion can be a Marine Rope "Chopped Fiber" or cord material. The example embodiment can use recycled marine rope chopped up as a substitute for glass fiber, hemp fiber, etc. in a core or cap layer structure.

In an example embodiment, the raw material for extrusion can be a Marine PU Foam. Recycled filler foam provides a means to use recycled marine material content as a foam structure inside of the board core structure.

In an example embodiment, the raw material for extrusion can be a recycled material (e.g., cord, hemp, etc.) used as a cap layer. A recycled material layer is an option for the cap layer on an engineered sheet. The cap layer would provide the necessary material properties to the recycled materials core structure to allow a similar plywood thickness board to meet the same structural requirements. Using a recycled material cap layer is a more environmentally friendly and green alternative to traditional composites such as glass or carbon fiber composites. Within the cap layer, there exists the possibility of using different strand sizes, different strand orientations, different thickness, and different resins to achieve different mechanical properties, different visual exterior properties, and different recyclability ratings. In an example embodiment, the extrusion material formulation can be as follows: 50% glass fiber, 35% recycled plastic, and 15% virgin or new plastic. In other embodiments, the following extrusion material formulation can also be used: 50% glass fiber and 50% recycled plastic. In other embodiments, the extrusion material formulation can be 100% recycled post-industrial or post-consumer material. In yet another embodiment, the extrusion material formulation can be 100% virgin or new plastic. An example of the manufacturing process in an example embodiment is shown in FIG. 13.

Figure 13:
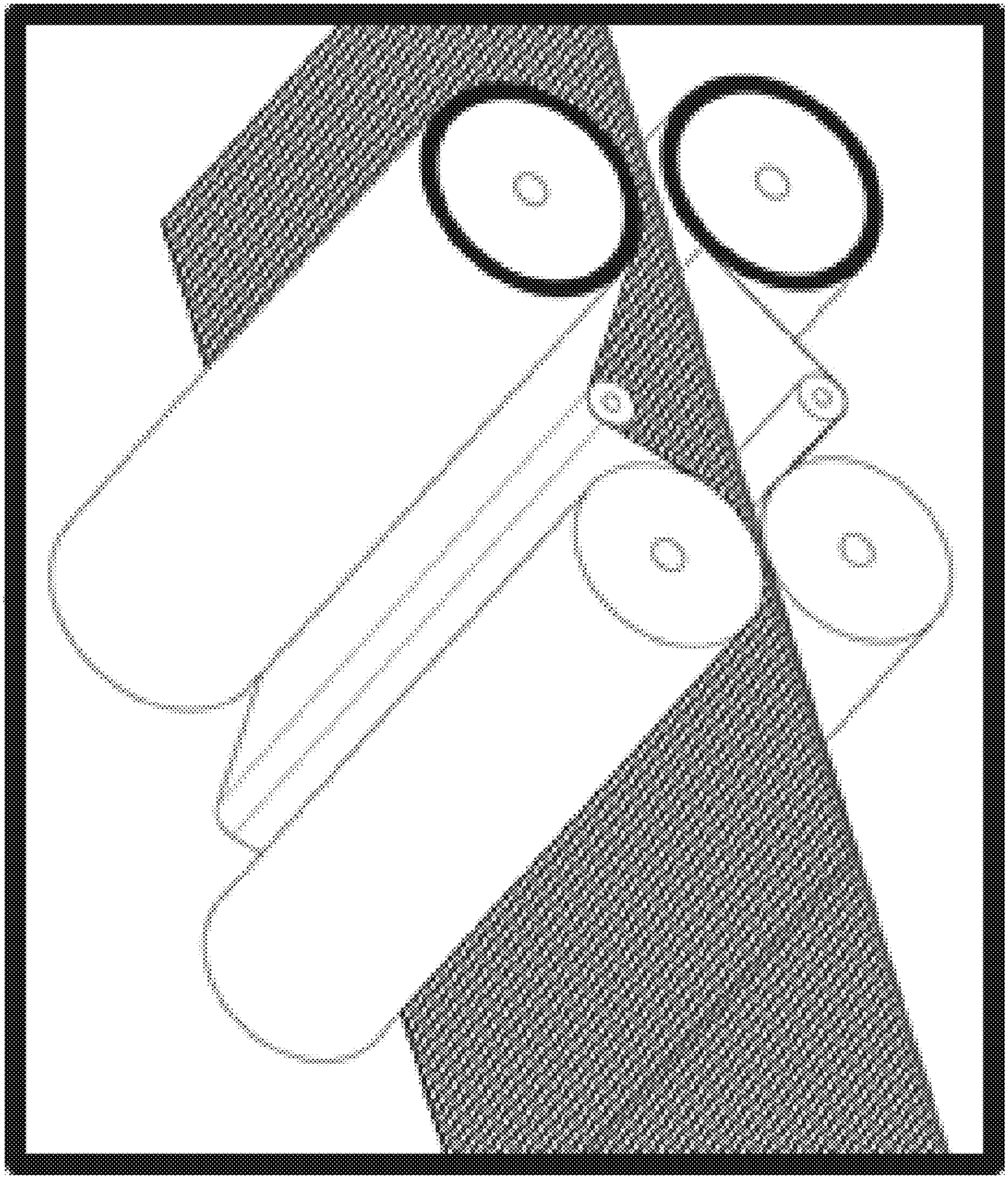
FIG. 13 illustrates an ISO view of a cord layer being sandwiched between the core structure.

Referring to FIG. 13, the diagram is an ISO view of a cord layer being sandwiched between the core structure as described above. This manufacturing process can be configured so that the cord layer can be wetted with resin with the core structure and rolled together. The main purpose is to allow the core structure to mechanically fasten and absorb the cord layer. This will improve the interface strength and the joint between the core structure and the cord layer. In this example, the cord layers can be twine/hemp, aluminum, carbon fiber, plastic, etc.

Figure 14:
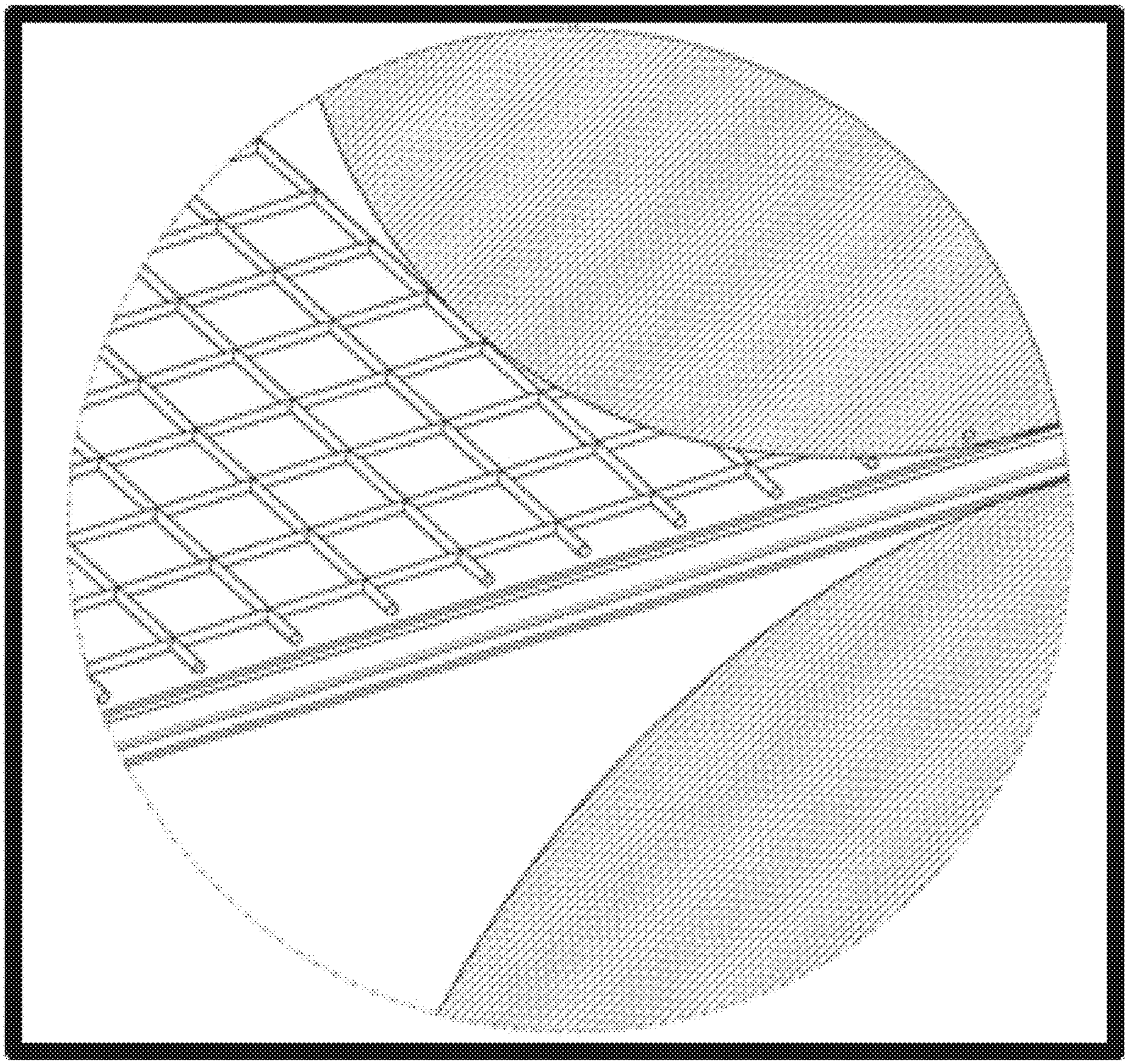
FIG. 14 illustrates an ISO view close up of a cord layer on top of the core structure.

FIG. 14 illustrates an ISO view close up of a cord layer on top of the core structure. In this example, a 90 degree pattern is shown, parallel and perpendicular to the roller/extrusion direction (X direction). Also in this example, the cord layer can vary in pattern alignment (0-90 degrees), as well as pattern alignment to the core structure (not perpendicular or parallel to the roller). This would also cause the directional stiffness and strength properties of the board to be altered to better suit installation conditions, customer needs, etc. The cord layer does not have to be similar in size and shape, and can be tuned to match performance requirements of the panel based on loads in different directions and/or placement in the building process.

In example embodiments, color coding can be added to the extruded material. Adding color coded material to each extruded material product can be beneficial in a multitude of ways. For example, color coded extrusion can enable a variety of processes, including the following:

Change the plastic color being extruded
Co-extrude multiple colors
Spray or Coat multiple colors
Etch into the panels In example embodiments, color coding can be added to the extruded material for a variety of reasons, including the following:

Red Panels→Fire Resistant
Blue Panels→Water Drain
XColor Panels→XFeature

Figure 15:
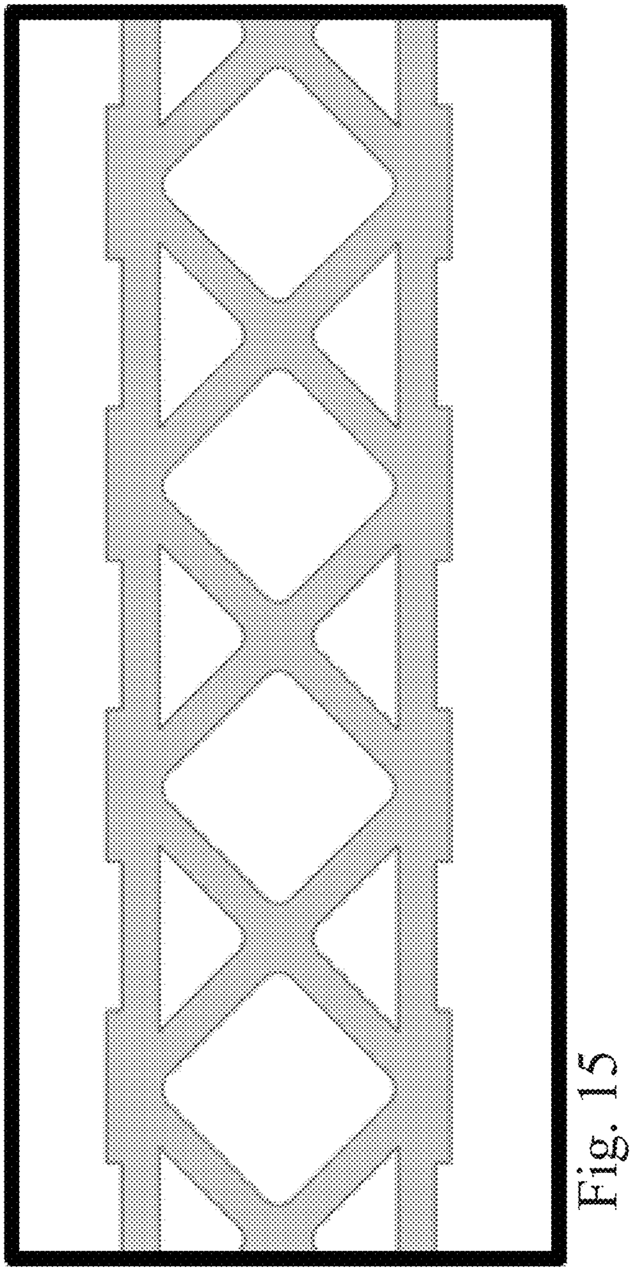
FIG. 15 illustrates a cross-section example showing a fastening slot.

In the various embodiments described herein, different types of construction material features can be fabricated into the extruded construction materials as disclosed herein. These different types of construction material features can include the following:

Fastening Slots (See FIG. 15 for an example embodiment)

FIG. 15 illustrates a cross-section example showing a fastening slot. This example provides visual location both for and during construction. This also provides internally to the core structure an easier installation area for a nail, screw, etc. along with a "self-aligning" guide channel to ensure an accurate fastener install.

Figure 16:
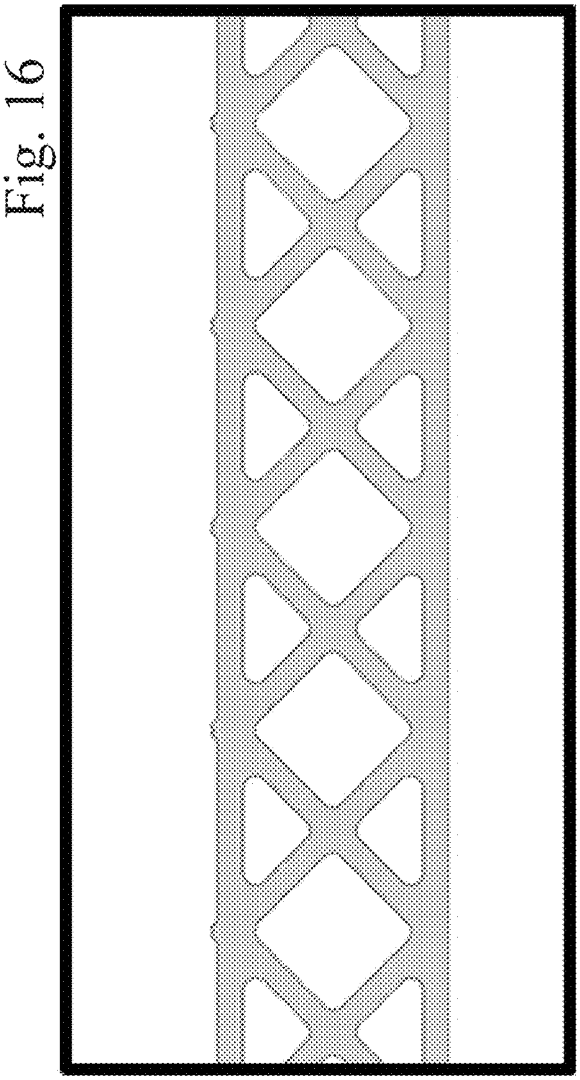
FIG. 16 illustrates a cross-section example showing an anti-slip feature for roofing or flooring applications to allow workers an immediate level of safety for board installation.

Anti-Slip Features (See FIG. 16 for an example embodiment)

FIG. 16 illustrates a cross-section example showing an anti-slip feature for roofing or flooring applications to allow workers an immediate level of safety for board installation. This example embodiment can be combined (with fastening slots or the like) or used exclusively based on customer preference.

Cutting Width Features

Similar to fastening and anti-slip surface features, the extrusion process can allow for predetermined grooves for width every (½ inch, etc.) that can be used to help trim boards to certain dimensions, thereby reducing installation and fitment time on the jobsite. The extrusion process can also allow for Angled A-Class Trim Marks. Similar to the cutting grooves, these would be angled to the extrusion direction to allow for angled board trimming (in eaves/awnings). This may require an additional step in the extrusion process, either using a movable die, or a post processing notch tool.

Figure 18:
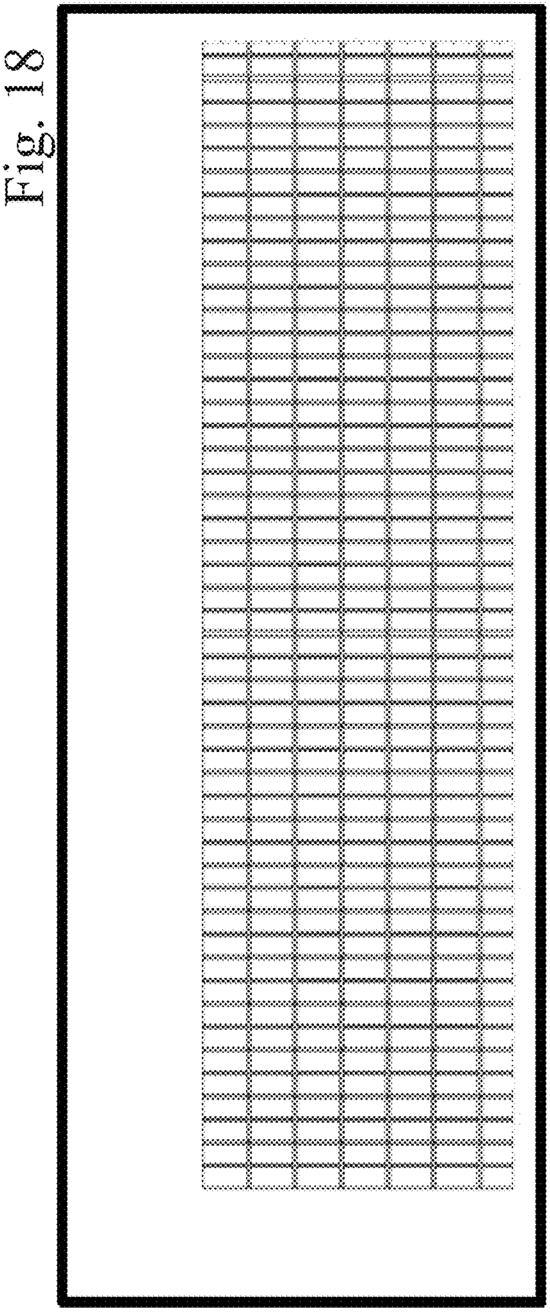
FIGS. 17 and 18 illustrate an example embodiment showing a combination of three features (fastening slot, anti-slip, and cutting width) on one board.
Figure 17:
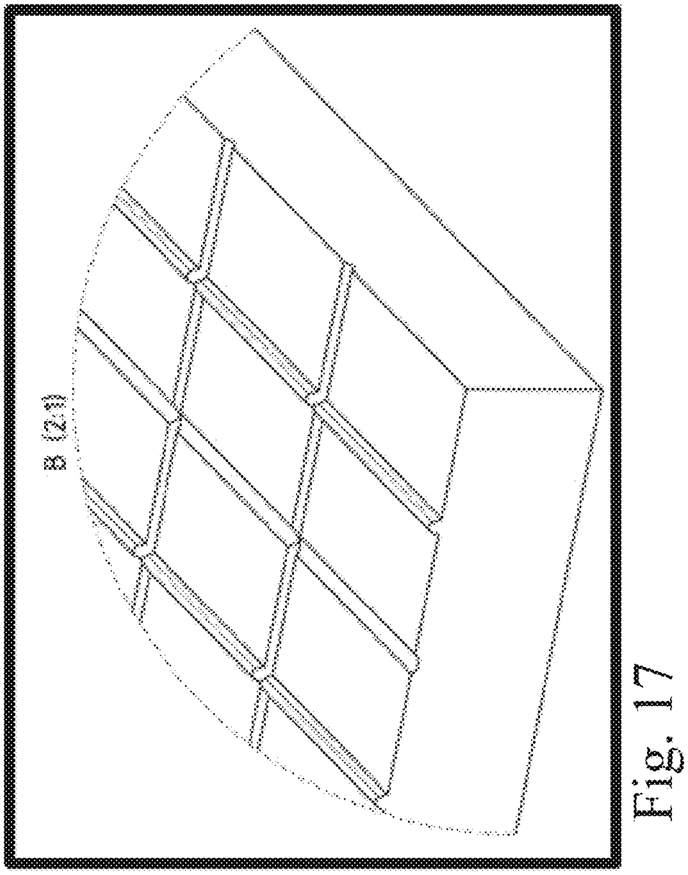

Referring to FIGS. 17 and 18, an example embodiment shows a combination of these three features (fastening slot, anti-slip, and cutting width) on one board for reference. In this instance, most of the three features can be extruded from the die, while the Y-direction features can be achieved with the patterned roller or a post process trimming procedure. FIG. 17 illustrates an ISO view showing the resulting pattern. Note that the board is shown as solid for illustration purposes. FIG. 18 illustrates an embodiment having separated and individualized fastening marks, trim lines, and anti-slip features.

In the examples shown, nailing marks are provided, which are 12" on-center. This feature of an example embodiment can allow for a datum building scheme, which is otherwise uncommon in construction. If the builder follows a 12" (or similar) on-center marking every time that is overlapped with a designated framing post, the stack up of panels can be predetermined and optimized. This allows for less waste material, as there will be a tighter communication and design loop between the architects, structural engineers, and builders ensuring board placement ahead of time. This also allows the possibility of removing the need for chalk lines, and can even allow for pre-trimmed boards. This also allows for further modularization, as it can become possible to pre-build assemblies in-house, or on the jobsite by using the marks to make sure everything is aligned and meets the drawings.

In the examples shown, there are also 1" (or similar) trim marks. As with the nailing marks on the board, the 1" (or similar) trim marks allow for a few options, including the following:

- Very quick reference lines to cut a board without the need to measure (both X and Y directions).
- Grooves in the board to either use to mark that board, use as a straight edge to mark another board or part, etc.
- Grooves that can be customized in the board to guide a handheld circular saw, table saw, etc. allowing for a straight edge cut, and less waste material.

Figure 19:
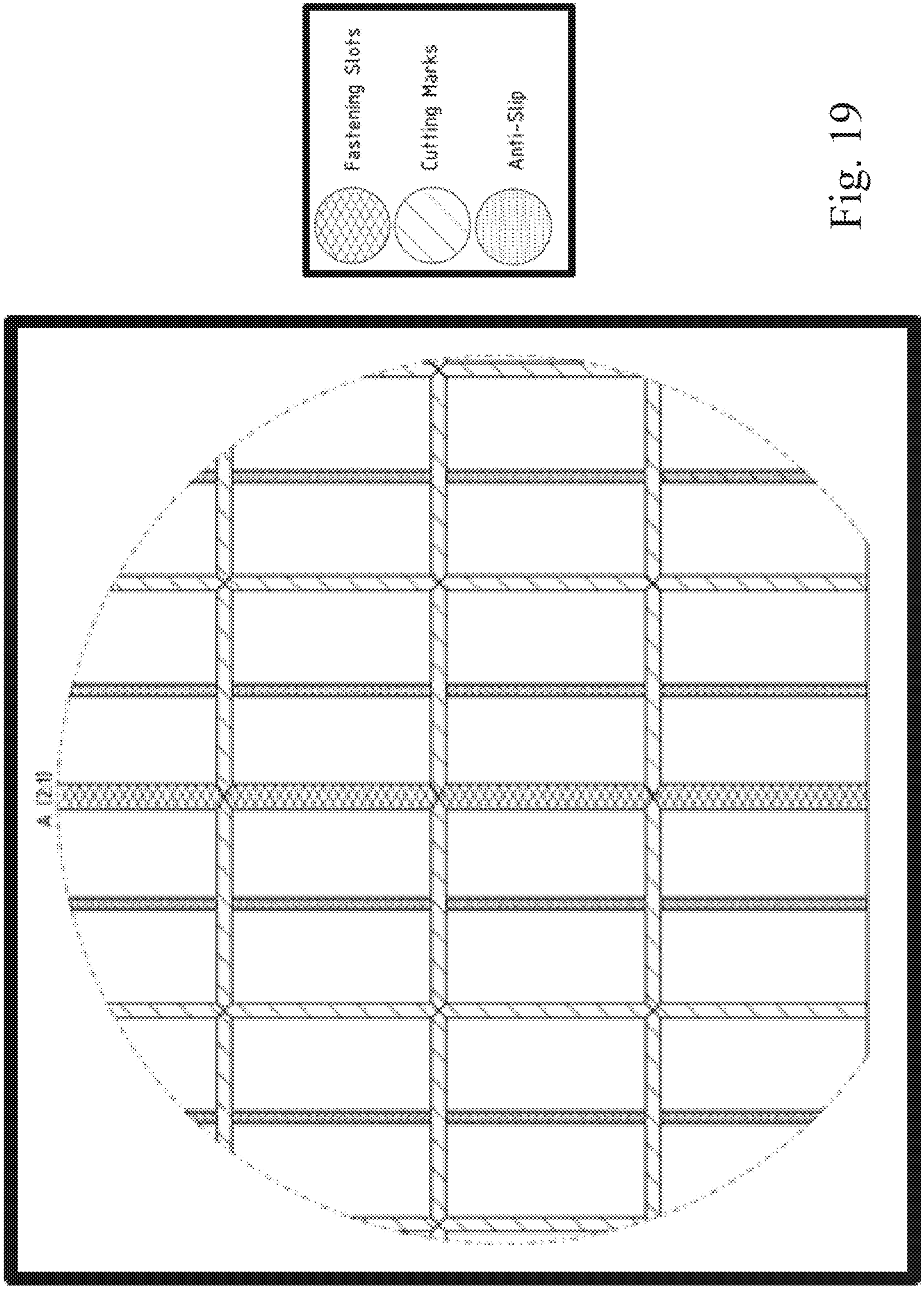
FIG. 19 illustrates an example embodiment showing anti-slip protrusions (above the surface XY plane of the board) that can be on both sides, one side, or customer specified.

Referring to FIG. 19, an example embodiment shows anti-slip protrusions (above the surface XY plane of the board) that can be on both sides, one side, or customer specified. As with the nailing and trim marks, the anti-slip features described here allow for a higher level of safety immediately upon installation.

Figure 20:
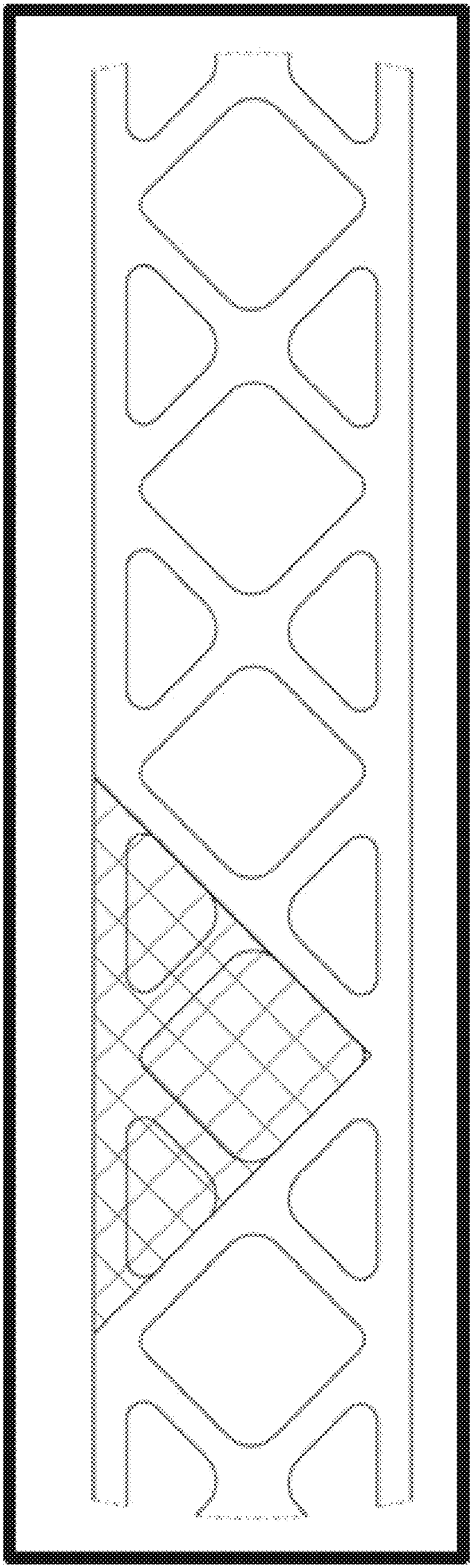
FIG. 20 illustrates an example embodiment of a Living Roofs Extruded Channel.

Referring to FIG. 20, an example embodiment shows an example of a Living Roofs Extruded Channel. Living Roofs are a possible option in building construction that now installs and/or requires living roofs as part of a LEED or green initiative. FIG. 20 illustrates an example embodiment with an "Opened" Cross section to allow for a vegetation trough that can support a variety of living roof options. A further example, includes a time dependent roof board pre-fabricated with seeds, water, and soil to begin growth immediately upon installation where the installer simply needs to puncture or peel back a thin containment layer to open the mixture to the surrounding environment.

In the various example embodiments described herein, different types of engineered components can be fabricated from extruded recycled materials using the methods disclosed herein. The features of the engineered components, as described below, capture additional use cases, additional features, and additional applications and combinations of the extruded material boards when trimmed, cut, or extruded in a way to add external features to the extruded board edges (e.g., edges running in the X-direction that have been extruded). Some features described below relate to sealing between boards, fastening between boards, and/or gap setting.

Figure 21:
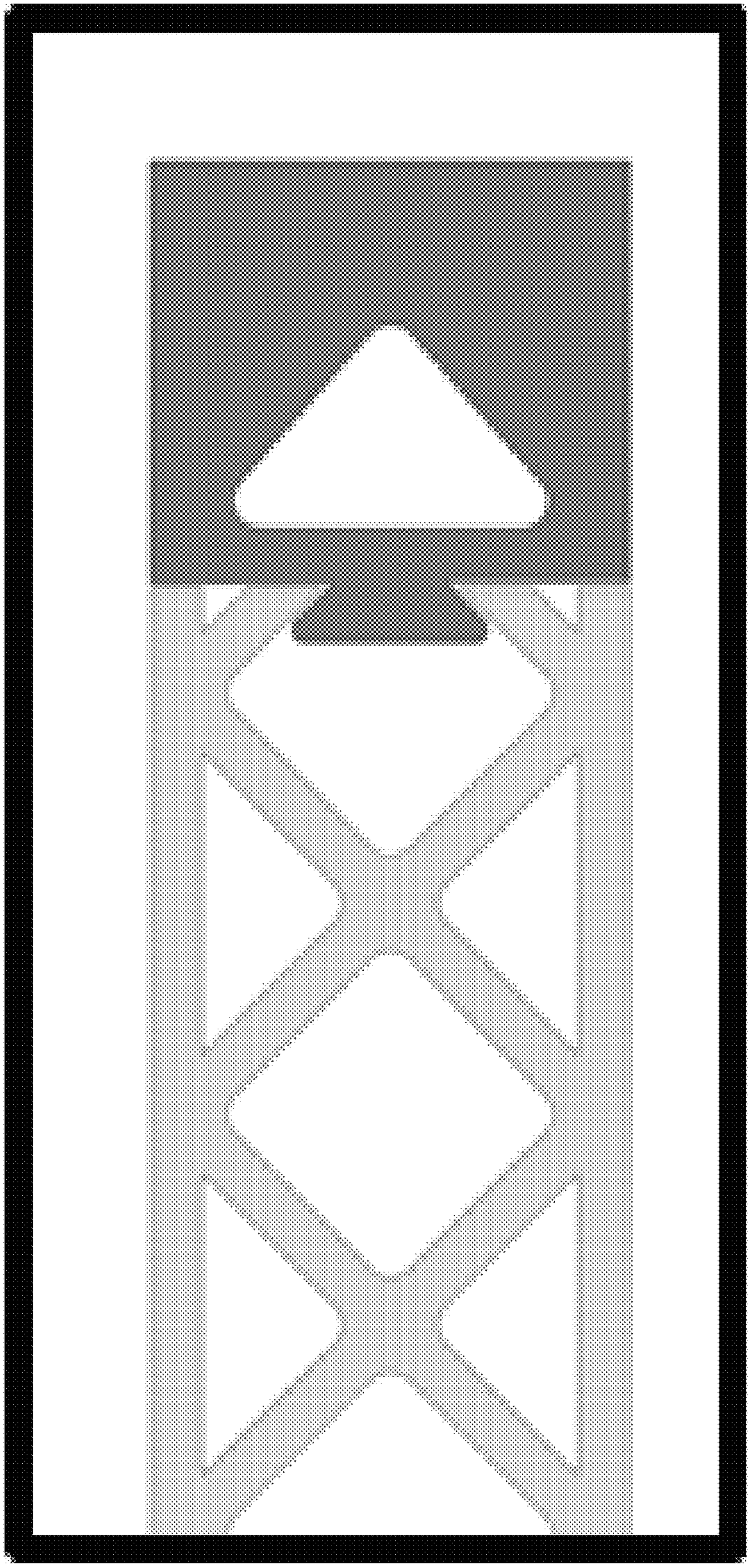
FIG. 21 illustrates the disclosed extrusion methods to enable fabrication of custom components with add-on features to link in an interlocking fashion with other conventional components or with other extruded material boards.

The example embodiments of the construction material extrusion methods disclosed herein can be used to fabricate custom components, such as a custom dimension board. Additionally, the disclosed extrusion methods also enable fabrication of custom components with add-on features to link in an interlocking fashion with other conventional components or with other extruded material boards. See FIG. 21 for an example embodiment. These features would not necessarily have to be extruded in shape. The final design can occur on a jobsite via a cutting or trimming procedure that exposes an underlying core structure that supplements the features. These features can be an engineered extruded recycled material design. These features can also be an open source retaining feature for external suppliers to adapt as they see fit.

Figure 22:
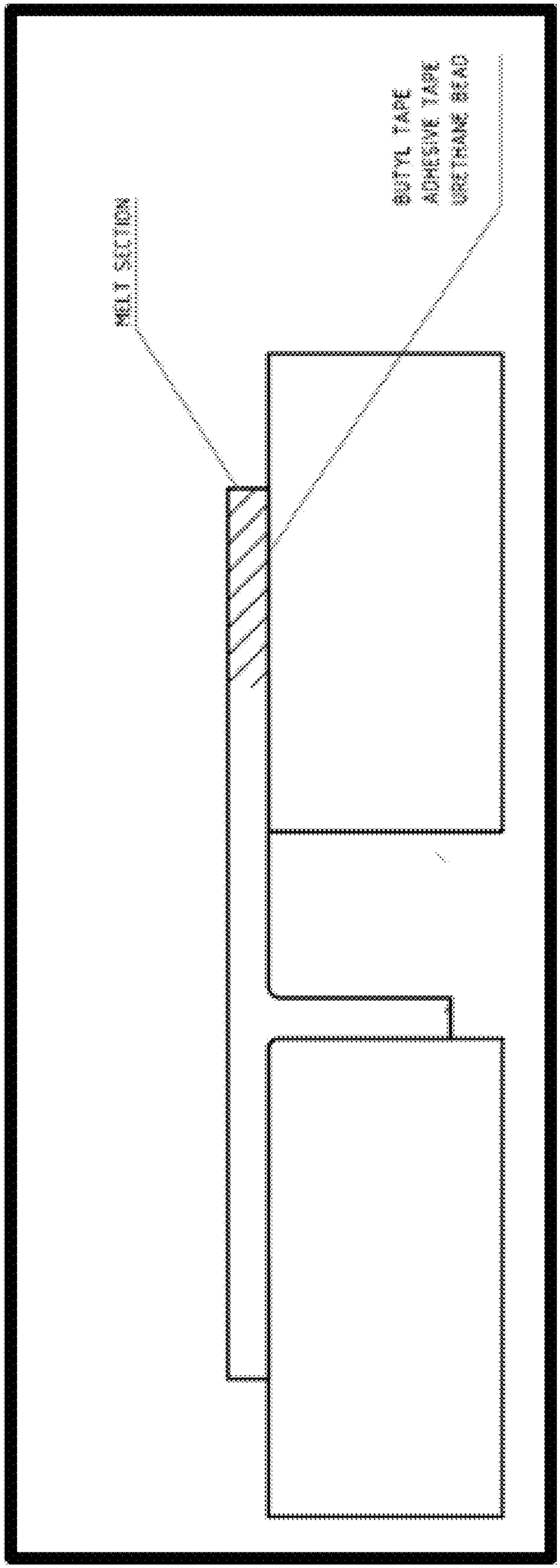
FIG. 22 illustrates an example embodiment of a custom component with a meltable plastic edge for sealing.

Referring to FIG. 22, an example embodiment of a custom component with a meltable plastic edge for sealing is shown. In this instance, a one-sided co-extruded gap seal is shown, along with a pre-described building code gap between two boards. Once the boards are assembled to framing, the gap seal is attached to the other boards for sealing, creating a sealed roof, wall, etc. FIG. 22 shows a cross section example making a sealed connection to the boards using any of the following joining techniques:

- A meltable section
- A joint created via butyl tape or similar material
- A joint created via an adhesive backed tape or similar material
- A joint created via urethane bead
- Any combination of the above used in conjunction
- A clip in fir-tree shape Depending on the co-extruded gap seal material (e.g., rubber)—this allows for a sealed joint between boards while allowing the rubber to expand and contract as the boards respond similarly whether due to foundation settling, temperature, and environmental factors.

Figure 23:
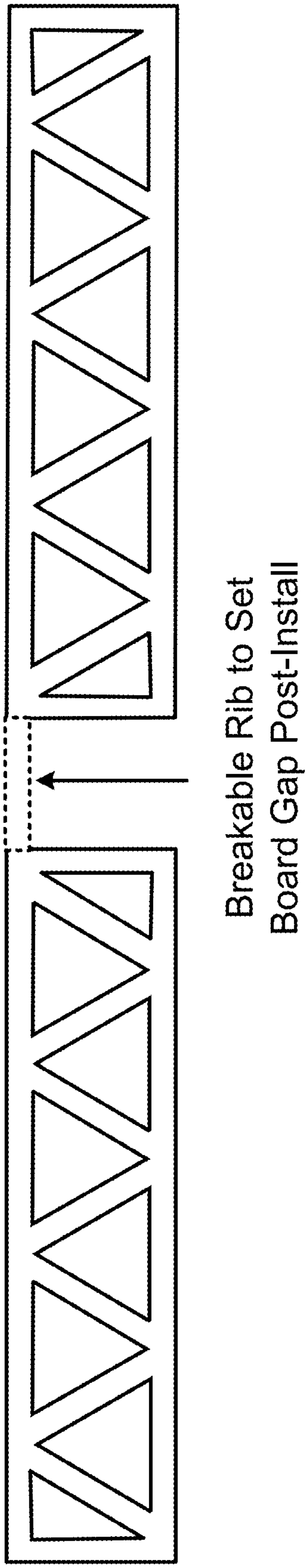
FIG. 23 illustrates an example embodiment of a custom component with a breakable plastic edge for gapping.

Referring to FIG. 23, an example embodiment of a custom component with a breakable plastic edge for gapping is shown. In this example, a custom component includes a breakable thin rib (extruded) to set a width post-installation, one sided. In this instance, a breakable thin rib is extruded onto the boards. At a minimum, this accomplishes two end goals:

- The rib can be extruded in any manner to set a predetermined width between boards to meet building code or builder preference as two boards are pressed against each other.
- The rib also acts as a datum reference in the assembly process, forcing the boards to be aligned, at a predetermined gap, and at a consistent gap across multiple panels.
- Upon installation, the rib can then be broken with a seam roller to allow the boards to have a gap between them to allow for expansion and contraction.

Figure 24:
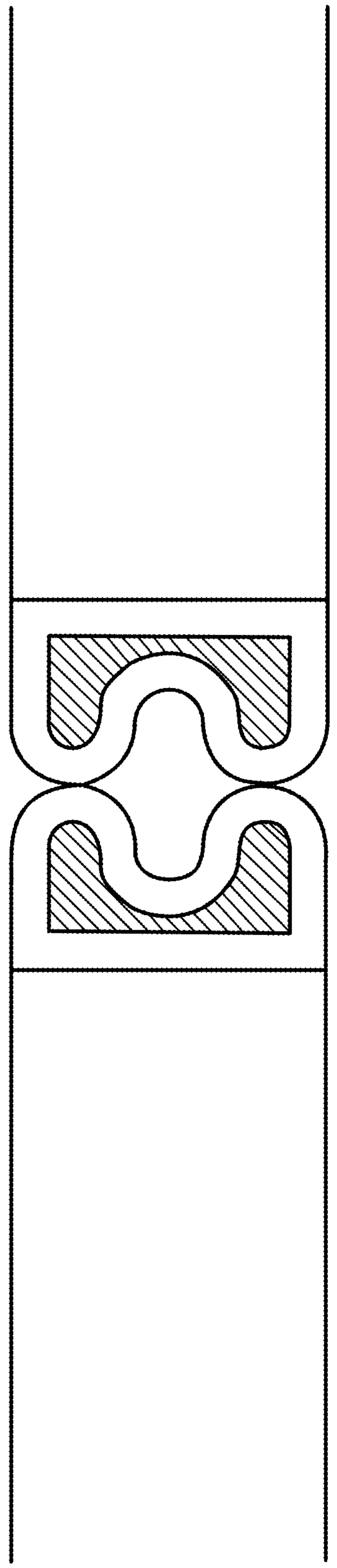
FIG. 24 illustrates another example embodiment of a custom component with two bulb seals.

Referring to FIG. 24, another example embodiment of a custom component with two bulb seals is shown. In this example, a custom component includes two bulb seals that can have a custom force curve (force to compress) to "feel" the gap. For example, as the boards get closer together, the force curve increases dramatically such that maintaining that gap would not be feasible; therefore, making an installation consistent and easy for the user. This example custom component automatically sets required panel gaps between boards to meet building code and allows for expansion, contraction, warping, etc. between boards. This example custom component also creates an automatic seam seal between boards that can handle gap variations (within specified tolerances).

Figure 25:
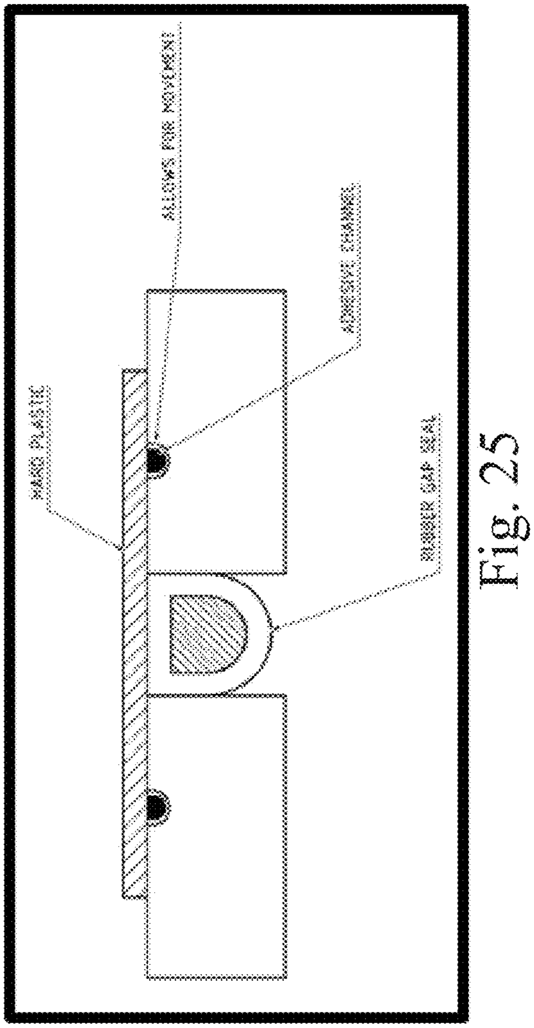
FIG. 25 illustrates another example embodiment of a custom component with a modular cover joint system.

Referring to FIG. 25, another example embodiment of a custom component with a modular cover joint system is shown. In this example, the method includes fabricating features that connect boards and provide sealing and/or structural reinforcement. As shown in FIG. 25, the method includes extruding a rubber or plastic track system with urethane bead channels into sheet. The rubber gap seal can be used for water, insulation, etc.

Figure 26:
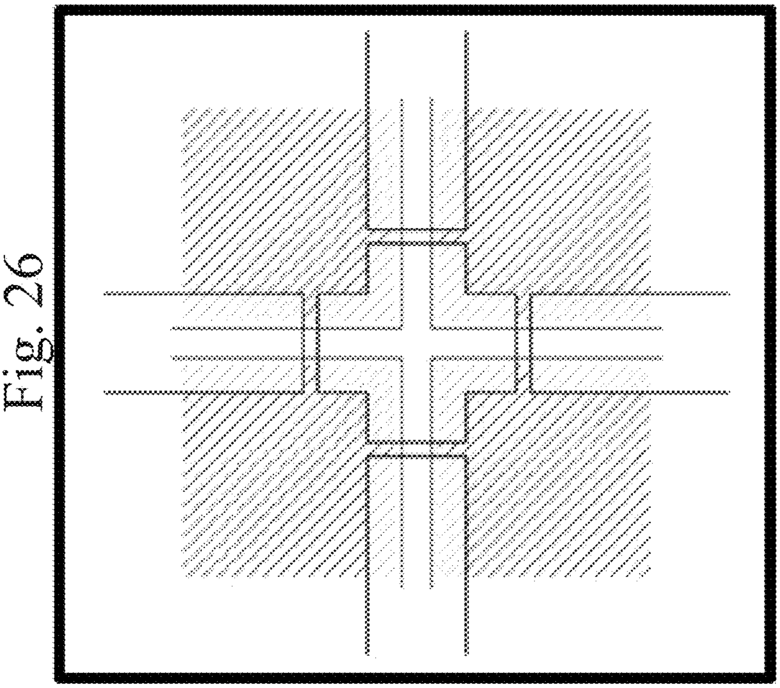
FIG. 26 illustrates a top down view of the aligning corners of four boards (XY Plane), the resulting gaps created, and the overlayment of the cover joint system.

FIG. 26 illustrates a top down view of the aligning corners of four boards (XY Plane), the resulting gaps created, and the overlayment of the cover joint system. The design and pattern can be fabricated as an architectural aesthetic joint.

Figure 27:
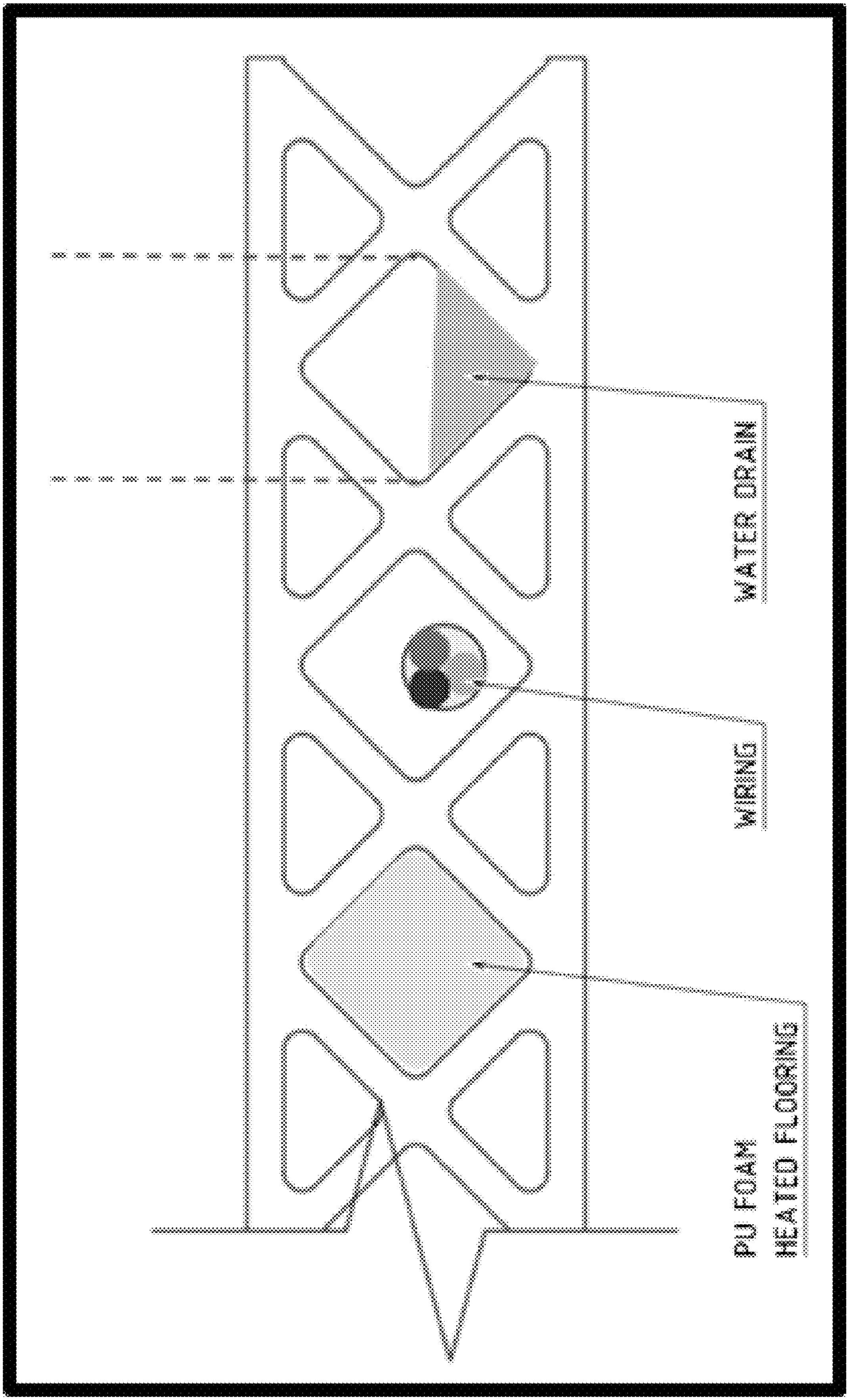
FIG. 27 illustrates other example embodiments of custom components with alternative option core structures.

Referring to FIG. 27, other example embodiments of custom components with alternative option core structures are shown. In these examples, the optional core structures shown relate to additional use cases implemented within the core structure of any extruded board as disclosed herein. FIG. 27 illustrates examples of the core structure options that can be created using the voided core portions of an extruded construction component. Note that the cross section placement and dimensions can be adjusted as needed during the extrusion process.

Example embodiments of the custom components with alternative option core structures can include the following forms:

- PU Foam or Similar Filler
  - Flexible polyurethane (PU) foam or similar filler can be added to the voided core structure to provide additional benefits to the extruded construction component. For example, acoustical foam can be added to create a "damped" panel, either blocking sound, or lowering the production of sound waves from the extruded construction component (e.g., noise, vibration and harshness—NVH).
  - PU Foam or similar can be added to change the thermal insulation value of the board for heating or cooling purposes
  - PU Foam or similar filler can be added to the voided core structure to provide a fire barrier or fire retardant foam.
  - PU Foam or similar filler can be added to the voided core structure to provide additional stiffness and strength to the extruded construction component, particularly in compression loads.
  - After the extruded construction component is extruded, foam can be injected down the length of the board to fill up the voided core structure as a post extrude foam mold.
  - While the extruded construction component is being extruded, the foam can be co-injected so that the extruded construction component is complete once cooled in a co-extruded foam injection process.
  - Once the extruded construction component is installed, foam can be injected into the extruded construction component in a post installation foam molding process.
- Wiring
  - Wiring or similar features can be added to the voided core structure to provide additional benefits to the extruded construction component. Wiring can be added to the extruded construction component as a better means of routing, organization, and protection for the wires in contrast to traditional installations where wiring is exposed behind paneling.
  - The wiring can be installed co-extruded
    - As the extruded construction component is being extruded, wiring can be fed into the die, allowing the possibility for the core structure to bond and/or encompass the wiring as an extra protective barrier.
  - The wiring can be installed in a post extrude install
    - After extrusion, the wiring is fed into the extruded construction component and down the core structure voids.
  - The wiring can be installed in a post installation install
    - Similar as above, but once the extruded construction component is installed in its final location, wiring can be fed into the extruded construction component and down the core structure voids.
- Water Draining (Gutter)
  - A water draining or gutter feature can be added to the voided core structure to provide additional benefits to the extruded construction component. The resulting "trough" can be added to the extruded construction component as a better means of providing water management on a roof or wall, without the need to wait for the gutter.
  - The trough can be installed as co-extruded
    - The gutter can either be extruded (designed in the die as an open top) or co-extruded in any additional water piping needed.
  - The trough can be installed as post extruded
    - In this instance, any piping can be installed after the extruded construction component has cooled, and or trimmed/cut to create an open top.
  - The trough can be installed as post installation install
    - Similar as above, but once the extruded construction component is installed in its final location, the trough can be installed.
- Heated Flooring
  - A heated flooring feature or tube can be added to the voided core structure to provide additional benefits to the extruded construction component. The resulting heat section can reduce the complexity and installation hassle associated with current methods. In addition, most heated floors are not-serviceable without damaging many of the flooring components to fix any issues. In example embodiments, the heating section can be added to the voided core structure in several ways.

The heating section can be added to the voided core structure as co-extruded

As the extruded construction component is being extruded, the heated flooring feature or tube can be fed into the die, allowing the possibility for the core structure to bond and/or encompass the heated flooring feature or tube as an extra protective barrier.

Post extrude install

After extrusion, the heated flooring feature or tube is fed into the extruded construction component and down the core structure voids.

Post installation install

Similar as above, but once the extruded construction component is installed in its final location, the heated flooring feature or tube can be fed into the extruded construction component and down the core structure voids.

Figure 28:
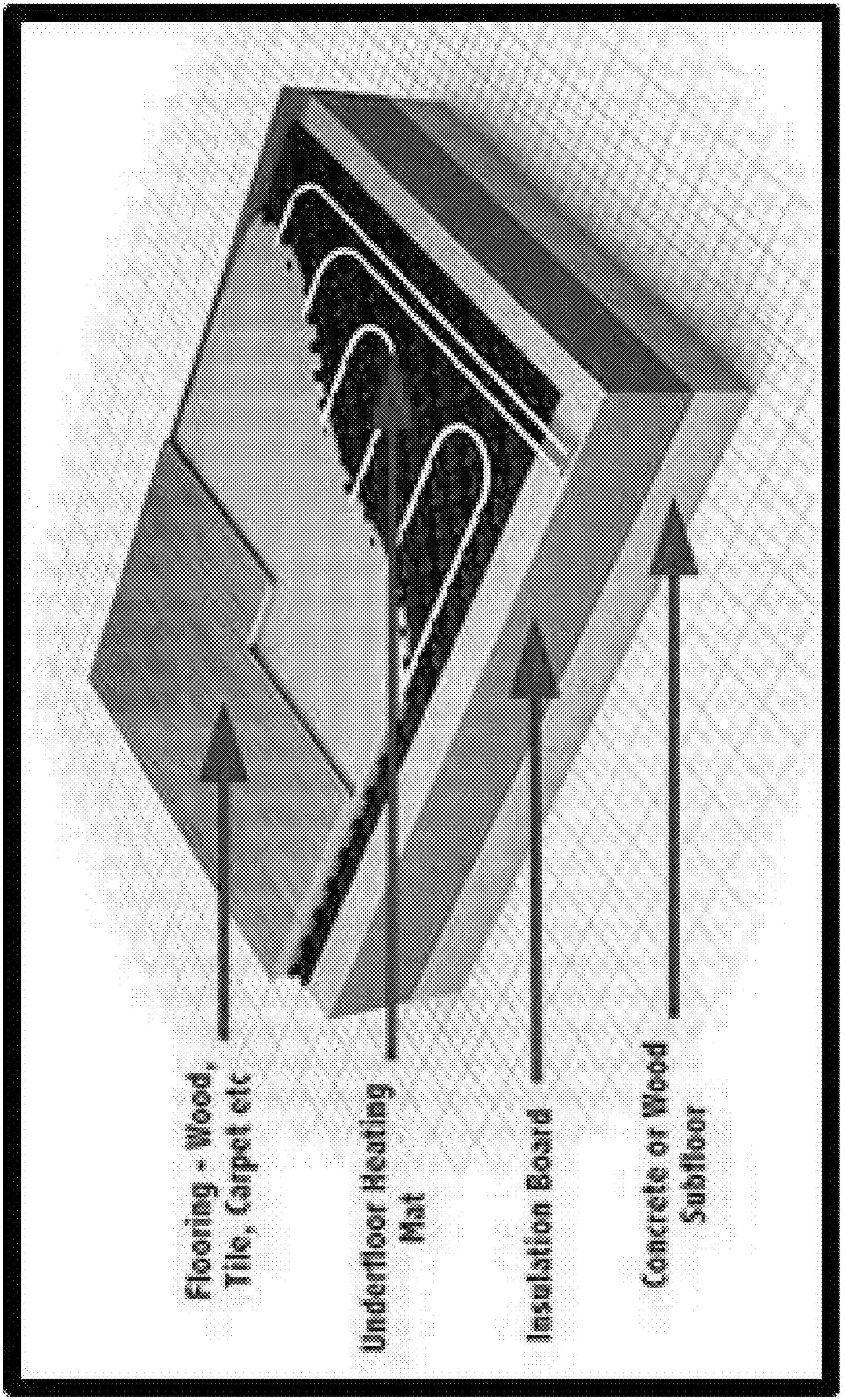
Fig. 28 (Prior Art)
FIG. 28 illustrates the extruded material component, which can contain within its core heating elements.

Referring now to FIG. 28, the extruded material component can contain within its core the heating elements as described above. This would mean when the subfloor is placed onto the joists, framing, or concrete pad, a builder would simply need to add their choice or flooring over top. This single piece extruded board can eliminate traditional issues and parts, such as the following:

Laying the heat pipe throughout the floor.

Pouring the concrete or other material to seal the piping (also making it essentially non-serviceable).

Removing most junction fittings, most hose connections, and most leak paths.

An additional variant of this concept would include an extruded material component that also has integrated flooring that is one piece and integrated into the extruded material component. In this instance, one extruded material component can contain all flooring components or layers needed in a building, and would simply be attached to the joists or framing of the floor without the need to install other traditional components.

In another example embodiment, heated roof boards can be used for snow or ice melting. This embodiment is similar in concept to the heated flooring implementation, however in this instance, the boards are roof installed.

In an example embodiment, the heating section can be added to the voided core structure as co-extruded. As the extruded construction component is being extruded, the heated flooring feature or tube can be fed into the die, allowing the possibility for the core structure to bond and/or encompass the heated flooring feature or tube as an extra protective barrier. In another example embodiment, the heating section can be added to the voided core structure as a post extrude install. After extrusion, the heated flooring feature or tube is fed into the extruded construction component and down the core structure voids. In another example embodiment, the heating section can be added to the voided core structure as a post installation install. Similar as above, but once the extruded construction component is installed in its final location, the heated flooring feature or tube can be fed into the extruded construction component and down the core structure voids.

In another example embodiment, water or other fluid can be contained in the core structure of an extruded material component. The contained water or fluid can be provided to serve a variety of purposes, including:

Heating or Cooling a Fluid Reservoir

In this example, water is pumped into board channels that is then heated naturally or thermally, and returned to the reservoir.

Insulation

In this example, water is pumped into roof board channels as a means of providing additional thermal mass to retain heat or require more energy to gain heat.

Fire Safety

In this example, water is held in the voided core structure only to be released upon board damage during a fire, providing a "self-healing" retardant feature to the board.

NVH

In this example, water is pumped into roof board channels as a means of providing additional material mass making the board "more damped" and reducing incoming sound waves or the ability to produce them.

Humidity

In this example, water is pumped into roof board channels as a means of retaining moisture in the boards for any secondary purposes (backup emergency water, etc.).

Figure 29:
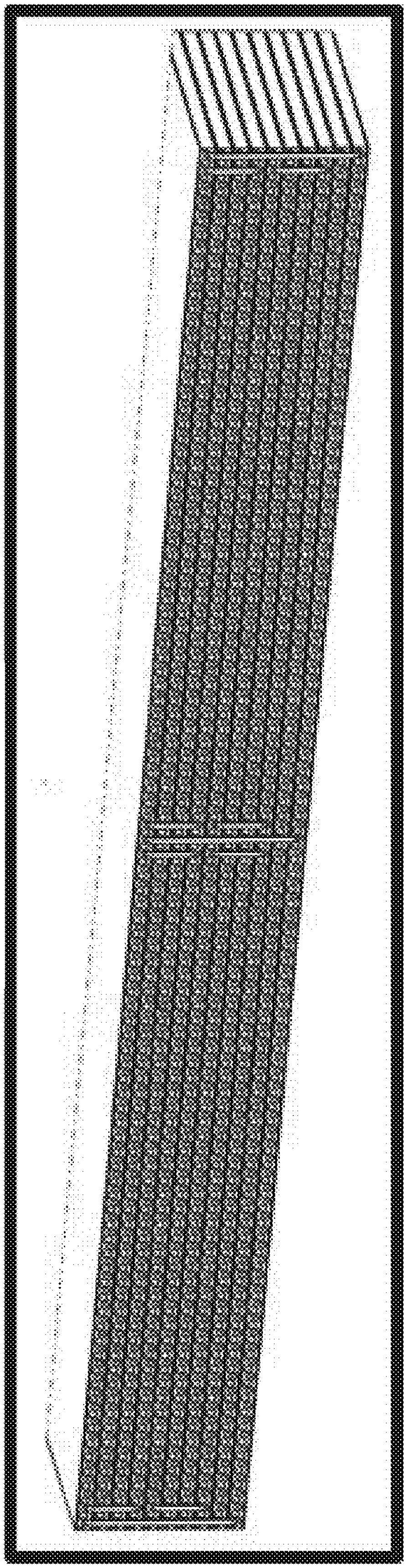
FIGS. 29 and 30 illustrate other example embodiments of custom components with alternative option core structures.
Figure 30:
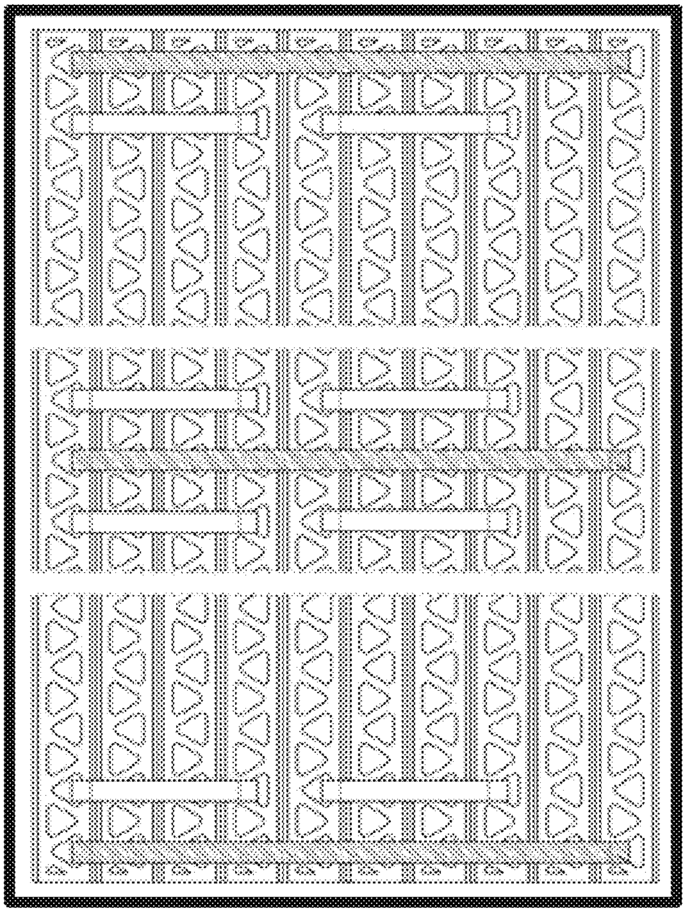

Referring to FIGS. 29 and 30, other example embodiments of custom components with alternative option core structures are shown. In these examples, the core structure voids can be used to support improved logistics. For example, the core structure voids can be used for shipping banding. Banding can be run through core structure voids to provide additional banding and attachment points not possible with a solid board. This feature makes it possible to pre-sort smaller stacks in a full board bundle. This feature can also improve safety for workers and installers. This feature also provides faster material routing to a job area.

As shown in the example of FIG. 30, a band strategy can be implemented where three (as an example) main bands contain the entire bundle to a jobsite or similar location. Note that in FIG. 30, a cut view is shown to condense the width of the board.

Referring still to FIG. 30, multiple inner bands contain smaller bundles of sheets that can be pre-sorted ahead of time allowing safer handling and placement of multiple sheets around the jobsite. Within an inner void core structure, boards can be used as their own pallet, to use smaller pallet "feet" locally, or use a hybrid non-traditional pallet. Referring still to FIG. 30, the extruded material boards can be used as a modular locking crate system.

In the various example embodiments described herein, different types of construction materials can be fabricated from extruded recycled materials with environmental features as disclosed herein. In an example embodiment, the extruded construction materials can be fabricated with a firesheet layer. Using the rollers in the extrusion process, and/or co-extruded, the environmental feature can be implemented by adding a layer of fire retardant (e.g., boron) within the cap layer or a sheet on top of the cap layer for fire protection. In another example embodiment, an actual flame sheet can be implemented using a supplier based flame sheet on rollers, integrated into the extruded board. In another example embodiment, voids filled with gas, liquid, or foam can be fabricated into the extruded construction component. In this example, the voided core structure can be filled with fire retardant chemicals and materials. In the event of a fire and as the board degrades, the filled voided core structure of the board would release that material combating the fire naturally, instead of only adding a combustible fuel to the fire.

In the various example embodiments described herein, different types of construction materials can be fabricated from extruded recycled materials with fastening features as disclosed herein. In an example embodiment, the extruded construction materials can be fabricated with the fastening features described below. The features described here relate to additional possibilities of all aspects of fastening extruded material boards. Most of these features are not possible with traditional sheathing materials because of the solid core structure or material compatibility with surrounding materials and processes.

In an example embodiment, construction materials can be fabricated from extruded recycled materials with a board to board interlocking feature. In this example, the extruded construction component is fabricated to create an interlocking joint between multiple boards similar to a traditional "tongue-n-groove" feature. In this instance, boards can be linked together by sliding them together in an X-direction, in applications that allow for locked systems. There also exists opportunities to tie boards together on their XY planar faces, as well as in the X-direction.

In an example embodiment, construction materials can be fabricated from extruded recycled materials with a fastener to board feature. In this example, the extruded construction component is fabricated to use the core structure voids as channels to automatically retain fasteners, in contrast to a traditional nail or screw installation.

In another example embodiment, construction materials can be fabricated from extruded recycled materials with an adhesive to framing feature. In this example, the extruded construction component is fabricated to use the core structure voids as adhesive channel guides and locators for bonding a board to framing.

In another example embodiment, construction materials can be fabricated from extruded recycled materials with a framing to board feature. In this example, the extruded construction component is fabricated to use a variation of the core structure to provide a mechanical locking feature to "fasten" the board to framing options.

In the various example embodiments described herein, different types of construction materials can be fabricated from extruded recycled materials with roof integration features as disclosed herein. In an example embodiment, the extruded construction materials can be fabricated with the roof integration features described below. In various example embodiments, a variety of different roofing options can be supported by the extruded recycled material boards. In general, the extruded construction materials fabricated with roof integration features can fall into three main categories:

- An extruded recycled material board
  - This roof integration feature category can replace like for like traditional sheathing.
- An extruded recycled material integrated board
  - This roof integration feature category can replace traditional sheathing, while including integrated features that allow for the inclusion of other traditional roof components.
- An extruded recycled material all-in-one board
  - This roof integration feature category can replace traditional sheathing, while including all roof components in one board.

Figure 31:
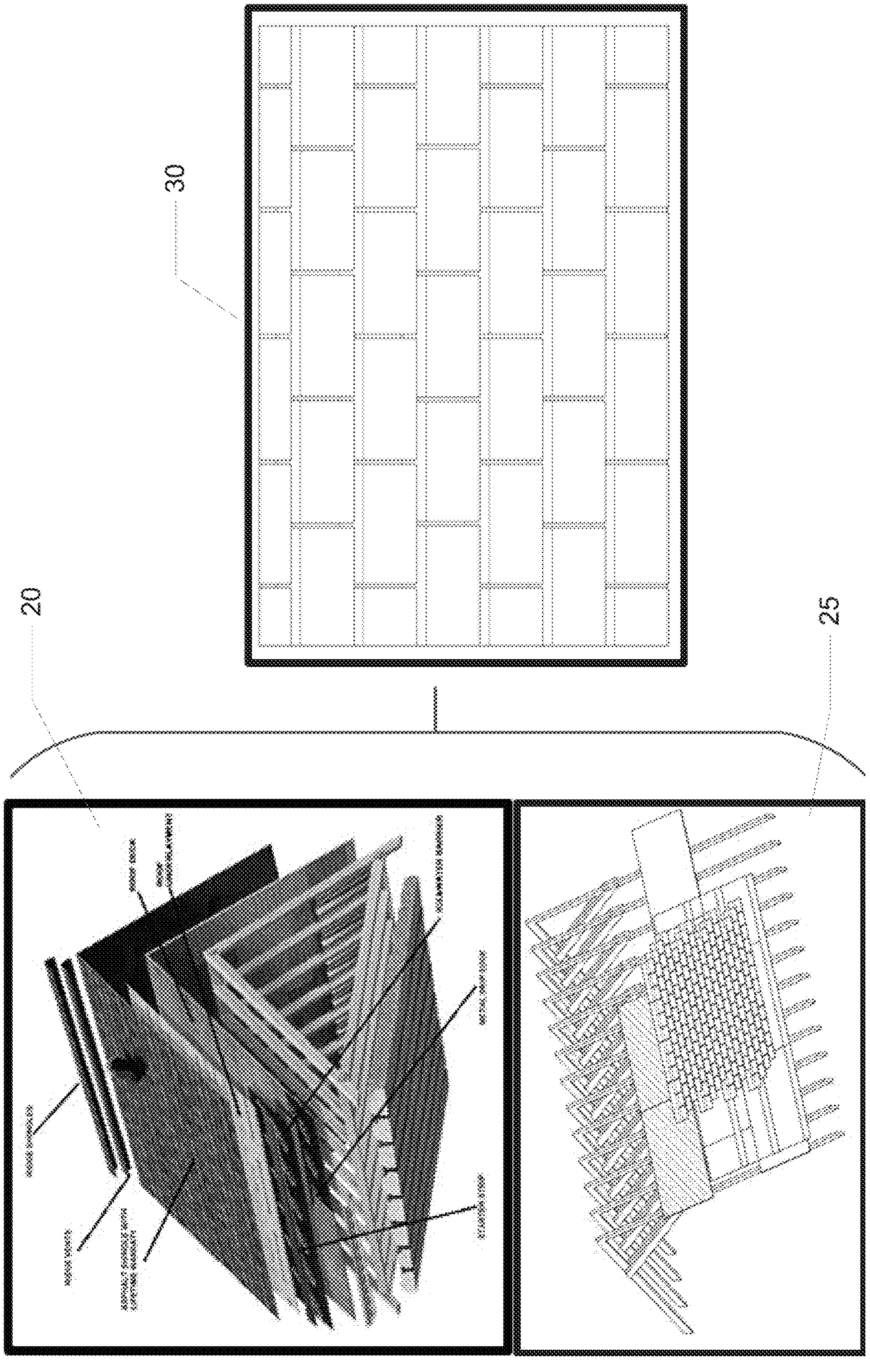
FIG. 31 illustrates a conventional roof component or layer diagram along with the consolidated extruded roofing board that can replace the traditional multi-layer roofs.

Referring now to block 20 of FIG. 31, a conventional roof component or layer diagram is illustrated. For context, roof frame spacing (span center) depends on a number of factors, ranging from typical options from 12" center-on-center out to 36" and further depending on conditions. In the exploded view of a traditional roof shown in block 20 of FIG. 31, the main components include:

- Timber Framing
- Roof Decking (Plywood)
- Ice & Water Barrier
- Roof Underlayment
- Roof Shingles/Tiles/Slate/Metal Roofing/etc.

For comparison purposes, block 25 of FIG. 31 illustrates a reference CAD image of traditional roof layers. In an example embodiment, the various traditional roof layers, applied conventionally layer by layer, can be integrated into a single consolidated roof component by integrating different types of construction components and systems fabricated using extruded materials. This integrated extruded board is a consolidation of all roofing components. In essence, once framing is complete, all that would be left is to attach an extruded board with roof consolidation elements and the roof would be complete. Such integration of layers into a consolidated extruded board is not provided in a traditional roof. In an example embodiment, the consolidated extruded roofing board can be a one piece, and compression molded during or post extrusion. As shown in block 30 of FIG. 31, the consolidated extruded roofing board can replace the traditional multi-layer roofs shown in blocks 20 and 25 of FIG. 31. The consolidated extruded roofing board as disclosed herein can replace all traditional components of normal roofing, including:

- Roof Underlayment
- Additional Ice or Water Barrier
- Trim Edges
- Shingles, Metal Roofing, Slate, Tiles, etc.

Although the examples shown in FIG. 31 are based on residential framed houses, the extruded construction materials disclosed herein can be used in a variety of different applications in addition to residential construction, such as commercial construction, industrial construction, government or infrastructure construction, and the like.

The consolidated extruded roofing board can implement industry standard roof shingles integrated as a one piece sheet. The consolidated extruded roofing board can be attached using any of the fastening options disclosed above. The consolidated extruded roofing board can also be fabricated with snow guards. In an example embodiment, snow guards can be molded to the roof panel where applicable. This would allow for the removal of an additional leak path (fastening hole into roof).

Figure 32:
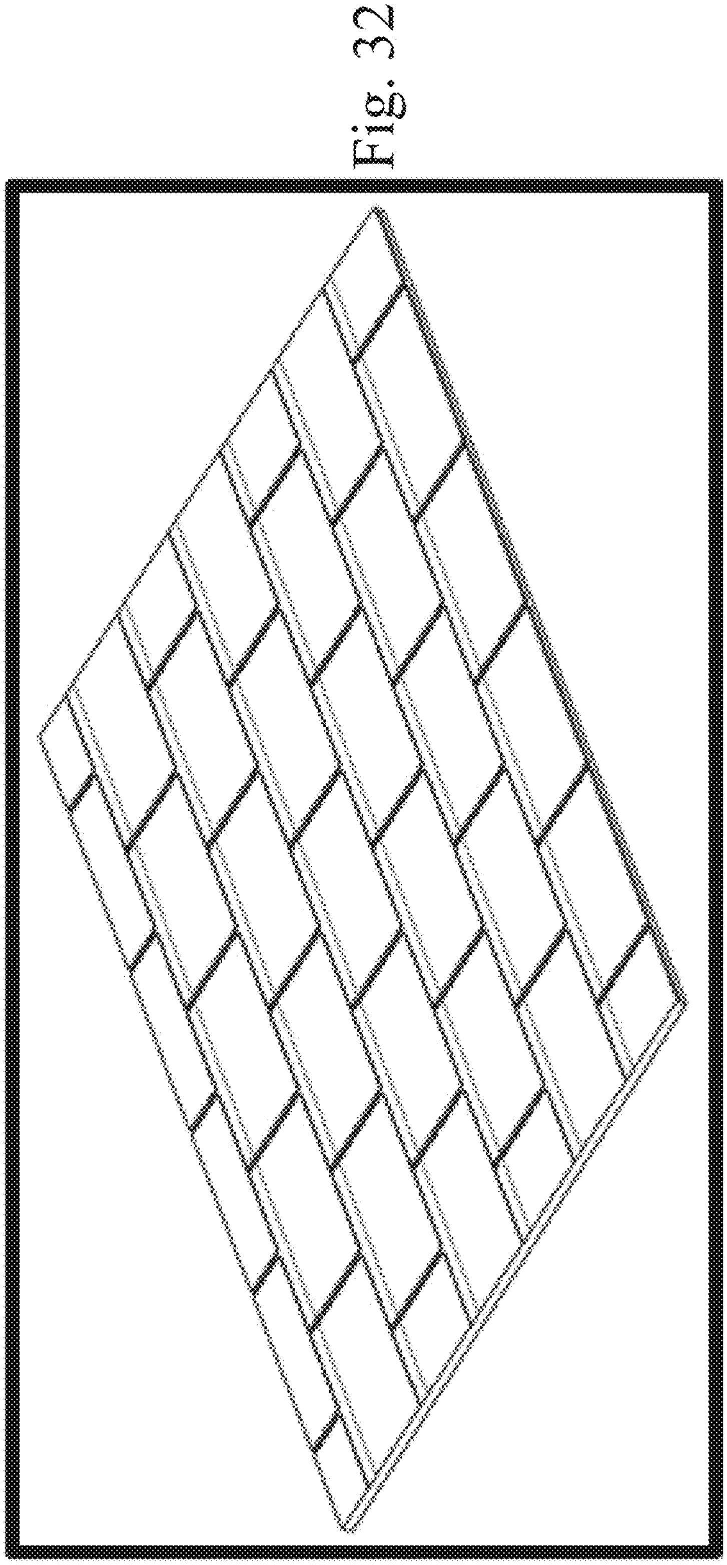
FIG. 32 illustrates an ISO view of the extruded roofing board with integrated shingles.
Figure 33:
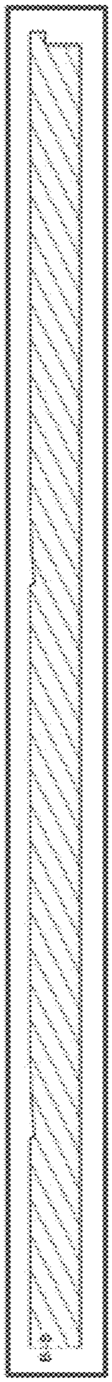
FIG. 33 illustrates side profile view of a YZ section plane cut showing a simplified core structure and shingle profile of overlapping shingles.
Figure 34:
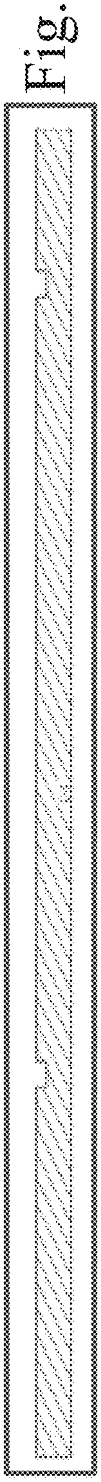
FIG. 34 illustrates side profile view of an XZ section plane cut showing a simplified core structure and shingle profile gap.

Referring now to FIGS. 32 through 34, an example embodiment of an extruded roofing board with integrated shingles is illustrated. FIG. 32 illustrates an ISO view of the extruded roofing board with integrated shingles. FIG. 33 illustrates side profile view of a YZ section plane cut showing a simplified core structure and shingle profile of overlapping shingles. FIG. 34 illustrates side profile view of an XZ section plane cut showing a simplified core structure and shingle profile gap.

Figure 35:
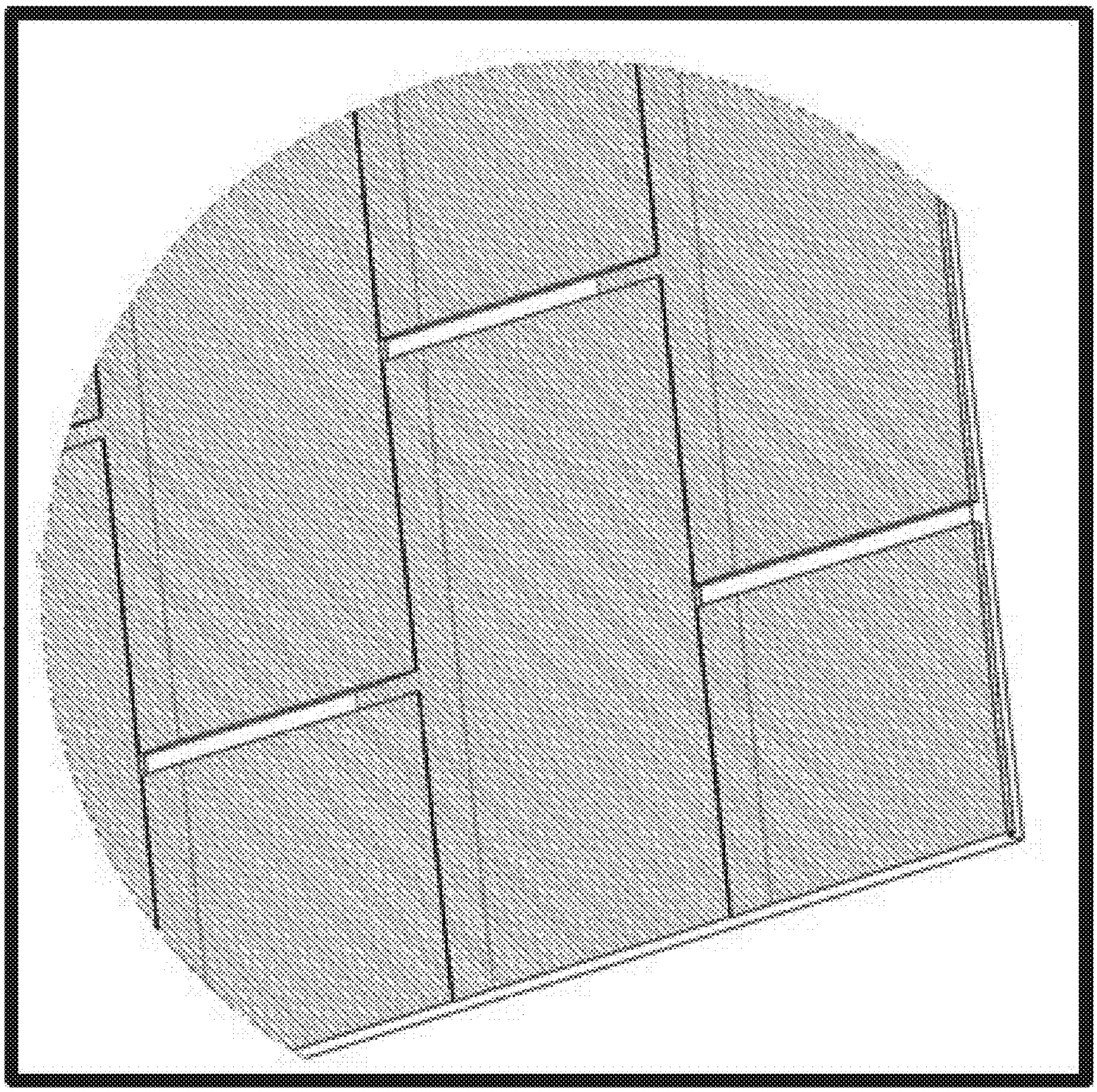
FIG. 35 illustrates an ISO section close up view of the extruded roofing board with integrated shingles showing the integration of a traditional shingle profile as one piece in the extruded recycled material core structure/cap layer.

FIG. 35 illustrates an ISO section close up view of the extruded roofing board with integrated shingles showing the integration of a traditional shingle profile as one piece in the extruded recycled material core structure/cap layer. The unmarked surfaces are standard thickness sheet that the shingle profile protrudes from to create the traditional shingle gap, overlapping pattern, and 3D surface texture. It is possible post-extrusion to then coat the extruded recycled material roofing board with a tar/asphalt shingle mixture, adhesive sealant, or similar product to enhance longevity and protection. A cap layer can also be co-extruded onto the board as well to change the roof color appearance. In other embodiments, the techniques employed for the fabrication of roofing boards as described above can also be used for a variety of different styles and form factors. In general, the disclosed techniques can be used to combine a plurality of layers (e.g., three to four) into a single form factor.

There exists a scenario where a one-piece extruded shingled sheet in use creates a noticeable seam where the boards meet on the roof. Typically, the seam is required in the building code as a spacing gap to allow for movement between boards throughout their service life. In an example embodiment of the methods described herein, a tile gap kit can be provided to service this spacing gap. In particular, the tile gap kit can create a solution to fill the spacing gap. This tile gap kit solution with gap tiles can provide several benefits with regard to the following:

- Sealing—these gap tiles can seal the seam at interfaces between plywood boards, creating a non-permeable roof as in typical construction.
- Aesthetics—these gap tiles enable and maintain the traditional shingled roof exterior look that is commonplace.
- Degrees-of-Freedom—these gap tiles are engineered to allow movement between the panels, but maintain sealing from the elements.
- Special Circumstances—additional gap tiles can be engineered to allow for additional instances where there are not perfect 90-degree joints (such as eaves, buttresses, etc.). These tiles either fill the gap or allow a trimmable edge to fill the gap.

Figure 36:
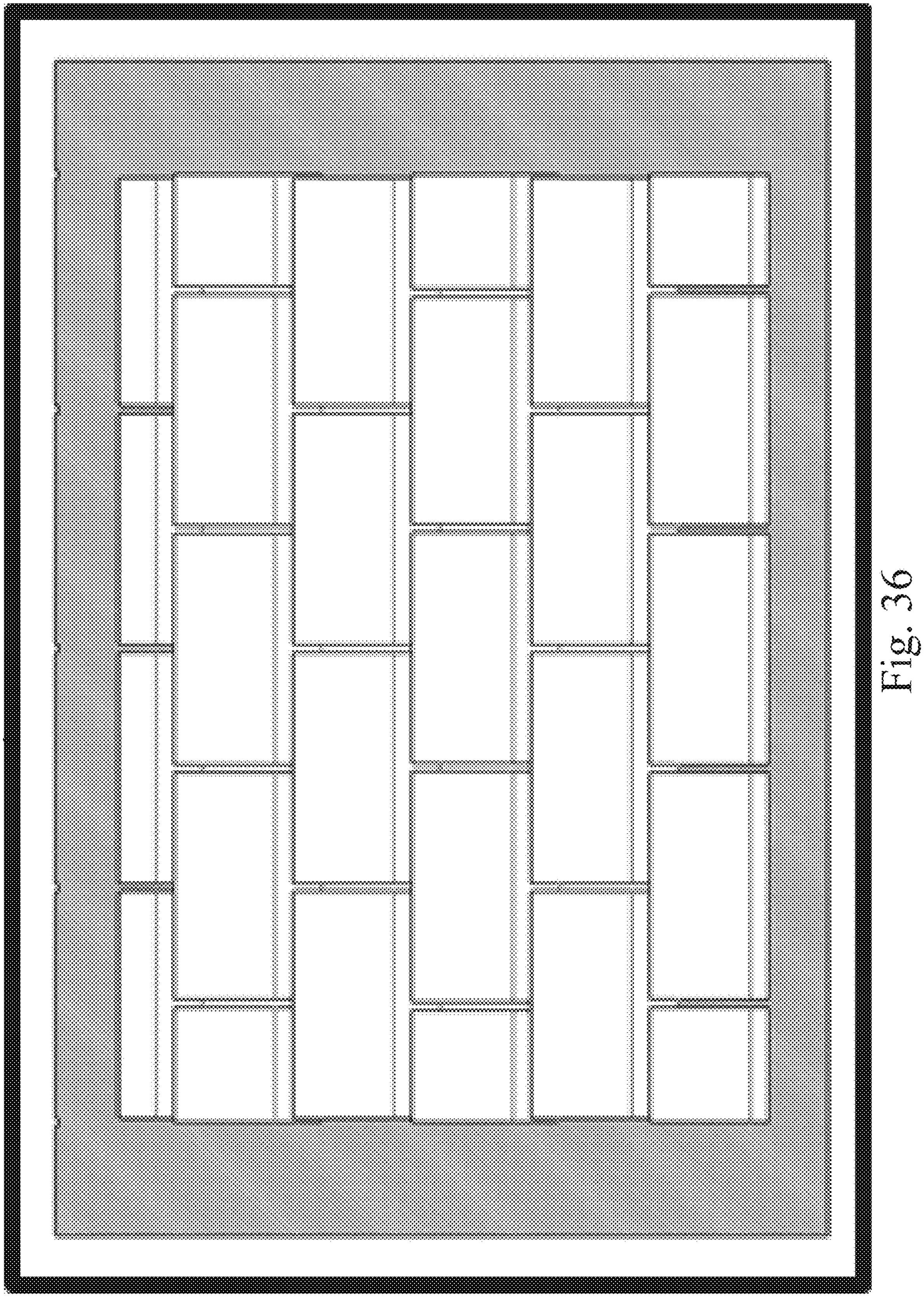
FIGS. 36 and 37 illustrate an example of a one piece extruded shingled board with recessed edges for overlapping shingle joints.
Figure 37:
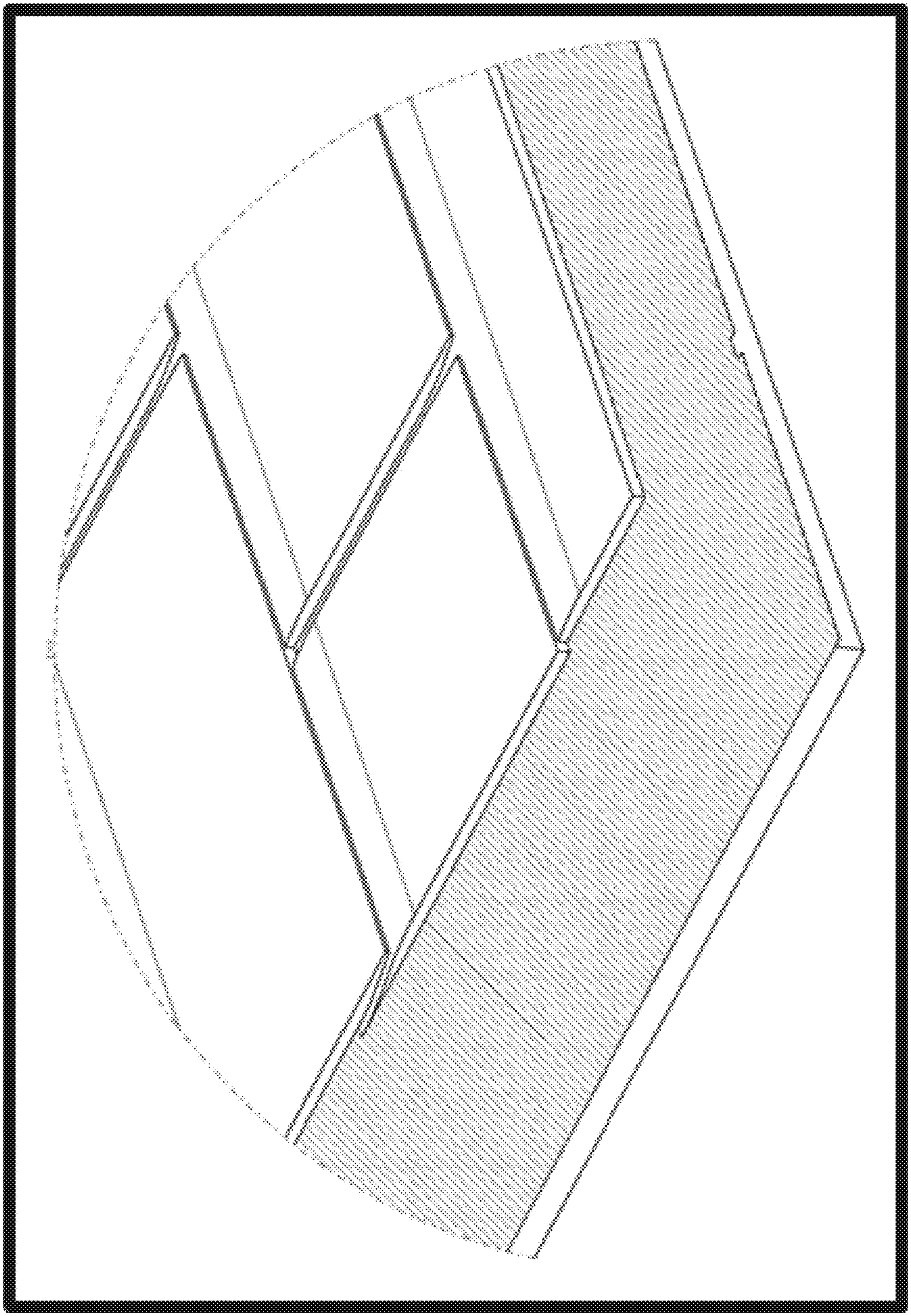

FIGS. 36 and 37 illustrate an example of a one piece extruded shingled board with recessed edges for overlapping shingle joints. In the example shown, this recessed edge area can be created in a number of ways including but not limited to: during manufacturing, during post processing, or during a jobsite installation (using special fixtures and jigs).

Figure 38:
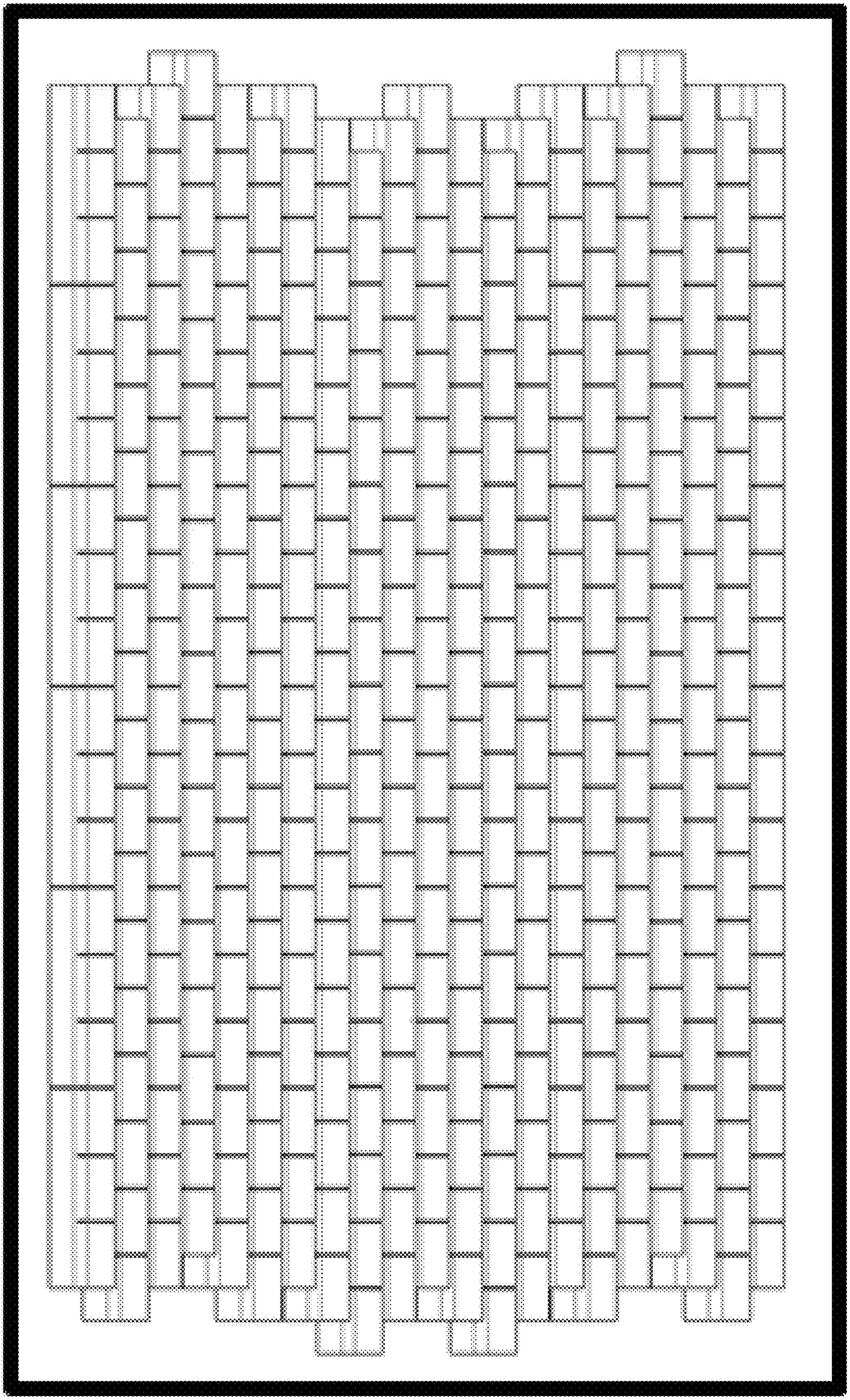
Fig. 38 (Prior Art)
FIG. 38 illustrates a top down view (XY Plane view) of a traditional shingle roof.
Figure 39:
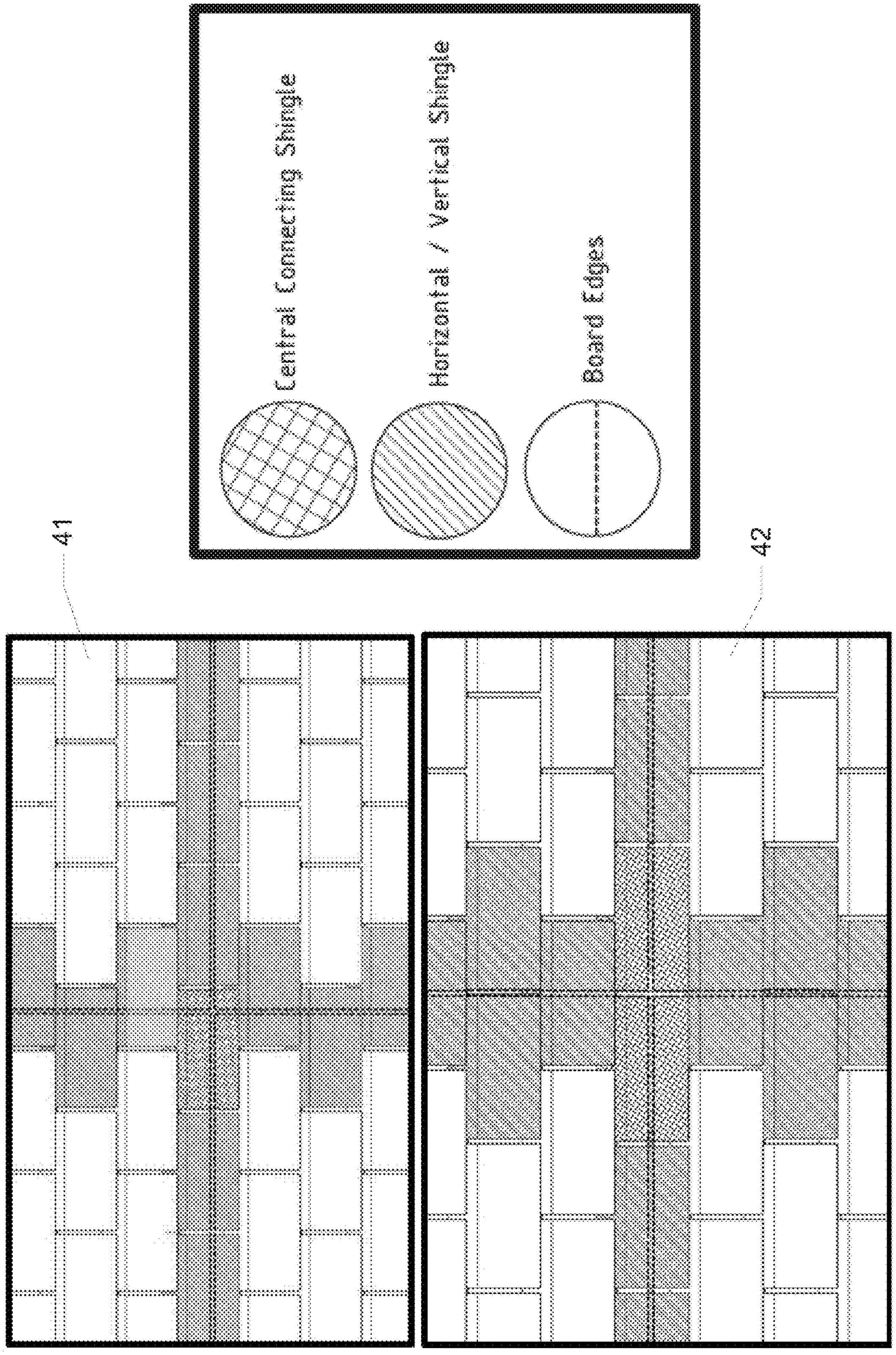
FIG. 39 illustrates example embodiments of four extruded shingled boards meeting at their interfaces as shown in a top down (XY Plane view)

FIG. 38 illustrates a top down view (XY Plane view) of a traditional shingle roof. FIG. 39 illustrates example embodiments of four extruded shingled boards meeting at their interfaces as shown in a top down (XY Plane view). The tile gap works to eliminate what would otherwise be a 4'×8' ft. gap grid on a roof. The shingle size shown is traditional, although there can be specific sizes to match certain patterns or layouts that can be defined by a customer/architect. In the example shown in block 41 of FIG. 39, the grid system of an example embodiment works on a concept where a main "junction" tile connects incoming horizontal and vertical gap tiles (shown in cross hatched representation in FIG. 39). In this instance, the vertical (Y Direction) shingles can be crisscrossed to avoid cut seams to fill the gap. Also, the horizontal (X Direction) shingles can be in-line to cover the horizontal board gap. In the example shown in block 42 of FIG. 39, the grid system of an example embodiment works on a concept where two main "junction" shingles connect incoming horizontal and vertical gap tiles (shown in cross hatched representation in FIG. 39). In this instance, the vertical (Y Direction) shingles are alternating between one shingle or two shingles to cover the gap and to avoid cut seams. Also, the horizontal (X Direction) shingles can be in-line to cover the horizontal board gap. By using the roof tile gap kit concept of the example embodiments described herein, there exists the possibility of non-traditional roof styles, in terms of the following:

- Shingle style, size, shape
- Shingle Alternative
- Gap Size
- Patterning and location
- Roof Seam purposeful exposure In the various example embodiments described herein, different types of modular roof styles can be fabricated using extruded roofing materials with roof integration features as disclosed herein. By creating a modular roof, there now exists the option to insert engineered modular components to seamlessly integrate into the extruded roofing tiles and boards. For example, the extruded roofing materials as disclosed herein can be integrated with: vent pipes, gutters, roof ridges, edge trim, sun lights, awnings, or the like.

Additionally, the extruded roofing materials as disclosed herein can be integrated with roofing safety features, such as: clip in foot holds, fall harness attachment points, railings, hardware "catches," or the like.

The extruded roofing materials as disclosed herein can also be integrated with solar energy features. For example, the extruded roofing materials as disclosed herein can be integrated with: standard solar panels, wherein extruded mounting channels can be provided for supplier solar panels thereby allowing for quicker installation and replacement. In another example, the extruded roofing materials as disclosed herein can be integrated with built-in solar features, such as extruded cooling fins. Additionally, the void structure of an extruded panel or roof element can be used for solar cable routing and management, as well as for protection from the environment. In another example embodiment, the extruded roofing materials as disclosed herein can be fabricated as a pre-assembled component similar to a roof tile board wherein the builder simply has to place the board on the framing and secure it. Integrated connection joint bridges between boards can be provided to handle electrical connections and draining connections.

In the various example embodiments described herein, different types of flooring options and flooring integration options can be fabricated using extruded flooring materials with flooring integration features as disclosed herein. In various example embodiments, the extruded flooring options fall into three main categories:

- An extruded flooring board to replace like for like traditional flooring materials.
- An extruded flooring board with integration features to replace traditional flooring materials, but including integrated features that allow for the inclusion or connection with other traditional flooring components.
- An extruded flooring all-in-one board to replace traditional flooring materials, but including all flooring components in one board.

Figure 40:
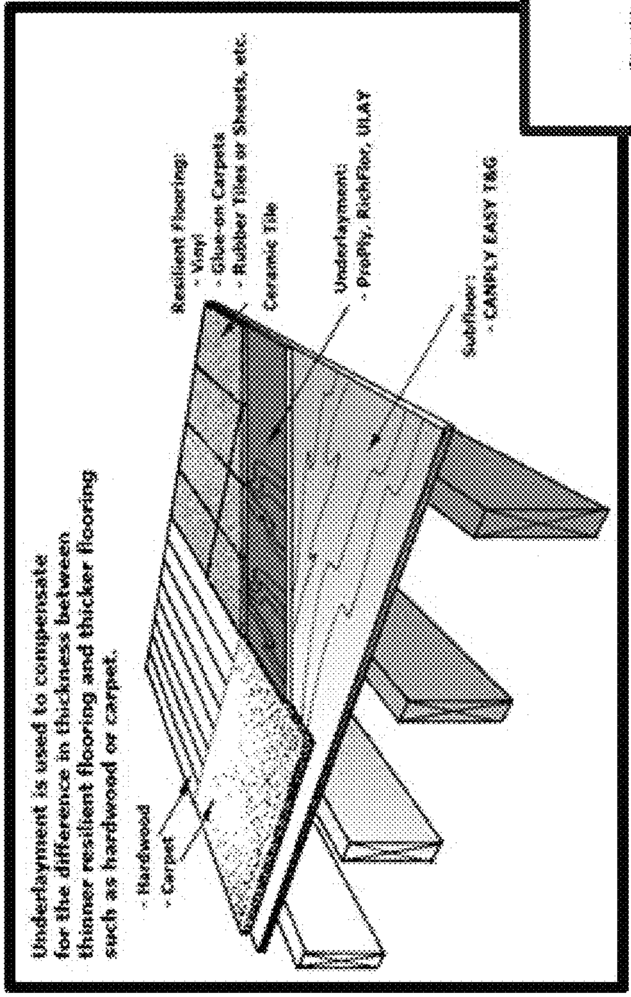
Fig. 40 (Prior Art)
FIG. 40 illustrates a set of layers installed for a traditional floor and subflooring layup.

FIG. 40 illustrates a set of layers installed for a traditional floor and subflooring layup. As shown, the main components of the traditional floor are: timber framing, subflooring (e.g., plywood), underlayment barrier, and depending on flooring—carpet, hardwood, vinyl flooring, tiles, etc. In the various example embodiments described herein, one or more of these traditional flooring layers can be replaced with an extruded flooring layer as described herein. Additionally, multiple traditional flooring layers can be integrated into a single extruded flooring layer. In some cases, custom sized extruded flooring components can be fabricated to integrate with or replace traditional flooring components. This is due to a vast array of different flooring options available, as well as the varied size of those options. In some cases, it may not be possible to hide the gaps between the boards as in the roofing options, so it would be beneficial to adjust the board size to match the desired end floor option, assuming the board size, shape, and placement meets load requirements, and spans the underlying support structure.

In the case of carpeting, extruded flooring components fabricated using the methods described herein can be used to install a pre-built subfloor. Similar to a roof shingle board, an extruded flooring component can be fabricated with pre-installed traditional subfloor components. Once floor framing is complete, the flooring installer simply has to install extruded flooring board to have a complete floor, as all flooring layers can be integrated into the extruded flooring board. The final flooring finishes (e.g., carpet, wood, vinyl derivatives, etc.) can be achieved: 1) during manufacturing using textured rollers or pressing in a roll sheet of material, 2) during post processing via a heated mold press or an adhesive, or 3) during a jobsite installation (using special fixtures and jigs).

In the case of hardwood flooring or tile, extruded flooring components fabricated using the methods described herein can be used to install a pre-built subfloor. Similar to a roof shingle board, an extruded flooring component can be fabricated with pre-installed traditional subfloor components. Once floor framing is complete, the flooring installer simply has to install extruded flooring board to have a complete floor, as all flooring layers can be integrated into the extruded flooring board. The final flooring finishes (e.g., wood, tile, etc.) can be achieved: 1) during manufacturing using textured rollers or pressing in a roll sheet of material, 2) during post processing via a heated mold press or an adhesive, or 3) during a jobsite installation (using special fixtures and jigs).

The extruded sheet components fabricated using the methods described herein can also be used as a protective matting. In various use-cases, the methods described herein can be used to fabricate an extruded sheet as a protective covering. An example of such use-cases is a building renovation, where cardboard and cardboard paper are typically used to protect the floor, walls, appliances, and ceilings. An extruded sheet as described herein can replace the cardboard protective coverings with an extruded sheet that includes a protective felt backing on one side. Because these extruded sheets are durable and moisture resistant, the extruded protective sheets can be reusable and customized in size and shape. Additionally, the stiffness and strength of the extruded protective sheets provides improved protection.

Similar to the roofing and flooring applications as described above, the extruded sheet components fabricated using the methods described herein can also be used as a modular system to ease the installation and service of traditional floor vents, or those engineered to match the product. The extruded sheet components fabricated using the methods described herein can also be used as different wall sheathing options. In general, the wall sheathing options fall into three main categories:

- An extruded wall board to replace like for like traditional construction materials.
- An extruded wall board with integration features to replace traditional wall sheathing components, but including integrated features that allow for the inclusion or connection with other traditional wall sheathing components.
- An extruded wall all-in-one board to replace traditional wall sheathing components, but including all wall sheathing components in one board.

Figure 41:
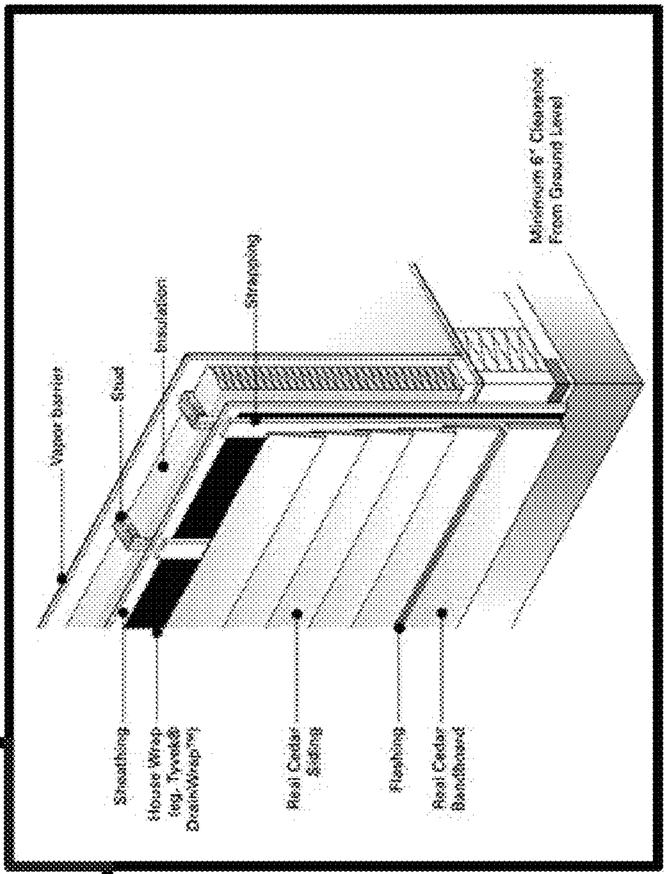
Fig. 41 (Prior Art)
FIG. 41 illustrates the layers in traditional wall sheathing (exterior and interior)

FIG. 41 illustrates the layers in traditional wall sheathing (exterior and interior). The main components in traditional wall sheathing include:

Siding
Underlayment Barrier
Strapping
Sheathing
Insulation
Framing
Vapor Barrier
Drywall In some instances, an extruded material board can replace traditional options in the building process. Some advantages of using an extruded board in place of traditional options include: 1) enabling wall wiring using the void structure of the extruded board allowing for easier routing and removal, as well as better protection of the wires; 2) enabling the use of pre-painted boards; and 3) facilitating the installation of wall insulation using the void structure of the extruded board thereby allowing adjustment of the R-value of the extruded board by filling the void structure with various materials of a desired R-value.

Similar in concept to the roofing and flooring applications described above, the extruded exterior board can be fabricated with all the traditional components of a traditional exterior cladding from framing outboard to the outside environment. In wall wiring can be provided using the void structure of the extruded exterior board thereby allowing for easier routing and removal, as well as better protection of the wires.

Other example embodiments of the extruded exterior board fabricated as described herein can include drainage features. The extruded exterior board can provide in-wall draining using the void structure of the extruded exterior board thereby allowing water routing or storage in the exterior walls.

The extruded exterior board fabricated as described herein can facilitate the installation of wall insulation using the void structure of the extruded board thereby allowing adjustment of the R-value of the extruded board by filling the void structure with various materials of a desired R-value.

The extruded exterior board fabricated as described herein can also facilitate the installation of wall layer mounting features. For example, an extruded sheathing board can be fabricated to contain common mounting features to enable an end user or builder to easily install or swap the final cladding should their preference change. The example embodiments also provide a means of easily replacing damaged cladding, or providing a customized sheathing that is configured with a build-ordered color, texture, design, or style, thereby allowing for a ready to install wall exterior or interior panel.

The extruded exterior board fabricated as described herein can also facilitate the installation of attachable extruded gutter components to connect into an extruded sheet. The integrated extruded sheet can be fabricated with standard gutter attachment points.

The extruded exterior board fabricated as described herein can also facilitate or replace the installation of underlayment barriers. For example, an extruded exterior board can be fabricated to replace traditional underlayment barriers, because of the inherent nature of the extruded exterior board as a water barrier. This implementation can replace the traditional underlayment layers.

In the case of stucco exteriors, extruded exterior components fabricated using the methods described herein can be used to install an exterior panel with a pre-configured texture, such as stucco. Similar to a roofing or flooring component as described above, an extruded exterior component can be fabricated with preinstalled or pre-configured traditional exterior cladding components wherein once wall framing is complete, the builder simply installs the pre-configured extruded exterior board to have a complete exterior wall. The final exterior cladding textures or finishes (e.g., stucco, woodgrain, stone, brick, etc.) can be achieved: 1) during manufacturing using textured rollers or pressing in a roll sheet of material, 2) during post processing via a heated mold press or an adhesive, 3) during a jobsite installation (using special fixtures and jigs), or 4) during post extrusion where stucco or other texture is applied on the production line.

In the case of stone or brick exteriors, extruded exterior components fabricated using the methods described herein can be used to install an exterior panel with a pre-configured texture, such as stone or brick. In a manner similar to the fabrication of an extruded exterior board with a stucco finish, extruded exterior components can be fabricated with a brick molded wall sheathing. The brick pattern can be non-symmetrical to match a user-specified brick pattern (e.g., different roller design, same extrusion die, etc.). The manufacturing process can be similar to the stucco manufacturing process described above.

Extruded material boards, as described herein, are extremely environmentally friendly. The core materials used to fabricate the extruded material boards are recycled materials and have a long life cycle. Cap layers can be stripped, trimmed, or ground off of the core material as a means to recycle the material into a “chopped fiber” for re-use. It is fully anticipated that at the end of life of an extruded recycled material product, it would either be recycled in some fashion or re-used, at a lower product specification capacity.

In another example embodiment, the extruded recycled material components or related shipping bands can be fabricated to include organic materials embedded in the components, thereby allowing a jobsite to “throw out” the bands as a means of re-generating plant life. In another example embodiment, the extruded recycled material component is extruded with removable paper wrapping during the extrusion rolling process. This can allow for a seed cultivating grass (or other plant) paper sheet from board delivery to be planted.

In other example embodiments, the extruded recycled material components can be fabricated with any of a variety of components or processes including:

- Aluminum Cap Layers
  - Wherein the composite cap layer is replaced with an aluminum alternative
- Carbon Fiber Cap Layers
  - Wherein the composite cap layer is replaced with a carbon fiber alternative
- Cabled Tension Systems
  - Wherein composite cap layer is replaced with cables of various materials to handle the majority of the tension loads in the board
- Specialized designs for Metal Framed Construction
  - Wherein the boards are adjusted in fastening methods to lock in to the metal framing, or use specially designed metal frame fasteners
- Wood Hybrid Composite Panels
  - Wherein if needed, the boards used a wood component in their material makeup, a wood cap layer, or a wood core to facilitate customer request, construction codes, or to accommodate older technologies
- Extrusion in Y or Z Direction
  - Wherein the boards are extruded in the Y or Z direction on specialty cases due to load constraints, packaging constraints, or customer request
- Honeycomb Cores
  - Wherein the core is a traditional honeycomb design to accommodate customer request, pre-existing products, or similar
- Multi Material Cores
  - Wherein the core is a traditional honeycomb design to accommodate customer request, pre-existing products, or similar
- Compression Mold Cores
  - Wherein the core is a compression molded vs extruded core to facilitate different load conditions or constraints with extrusions
- Injection Molded Cores
  - Wherein the core is a injection molded vs extruded core to facilitate different load conditions or constraints with extrusions

Concrete Formwork

The extruded recycled construction materials disclosed herein can also be used in concrete formwork. Because of the adaptability of the fabrication processes described herein, the extruded recycled construction materials for concrete formwork can be fabricated in a variety of variations, such as the following examples:

- Different thickness boards—Achieved by changing the die (and keeping all features as described above).
- Different Lengths—Achieved by changing the cut length on the extrusion machine, which is a benefit of the extrusion process. A longer formwork board allows for less seams, and a more consistent forming surface.
- Different Cap Layers—Can be used to add different cap materials to promote or demote bonding to the core material, depending on the substance to be formed.
- Moisture Protection—Because of the nature of concrete forming, water and moisture are involved. Given the material composition of the extruded recycled construction materials for concrete formwork; there is a high level of moisture resistance; the material composition keeps the board’s performance consistent; and the material is reusable without requiring additional preparation work, cleaning, or application of extra products to protect the surface.
- Hollow Core Structure—A hollow core structure concrete form board enables heating or cooling elements to be incorporated into the extruded board structure to provide a heated or cooled forming surface for concrete curing. A pressurized void structure, venting to the formwork, or “inflating” the core structure can also be implemented using the extruded concrete form board disclosed herein. Additionally, the extruded hollow core structure concrete form board disclosed herein can be used to apply pressure to separate the form board from the formed material. A pressurized void structure in which the pressure deforms the formed material in a controlled state can be used to decrease the surface area in contact with the formwork and promote removal of the formwork. Alternatively, the hollow core structure concrete form board can also be used to apply a vacuum force to cause the form board to adhere to the formed material. The hollow core structure concrete form board also allows the board to be slid over existing rebar, either reducing install time, or adding a means to help install rebar while setting up the formwork.

Figure 42:
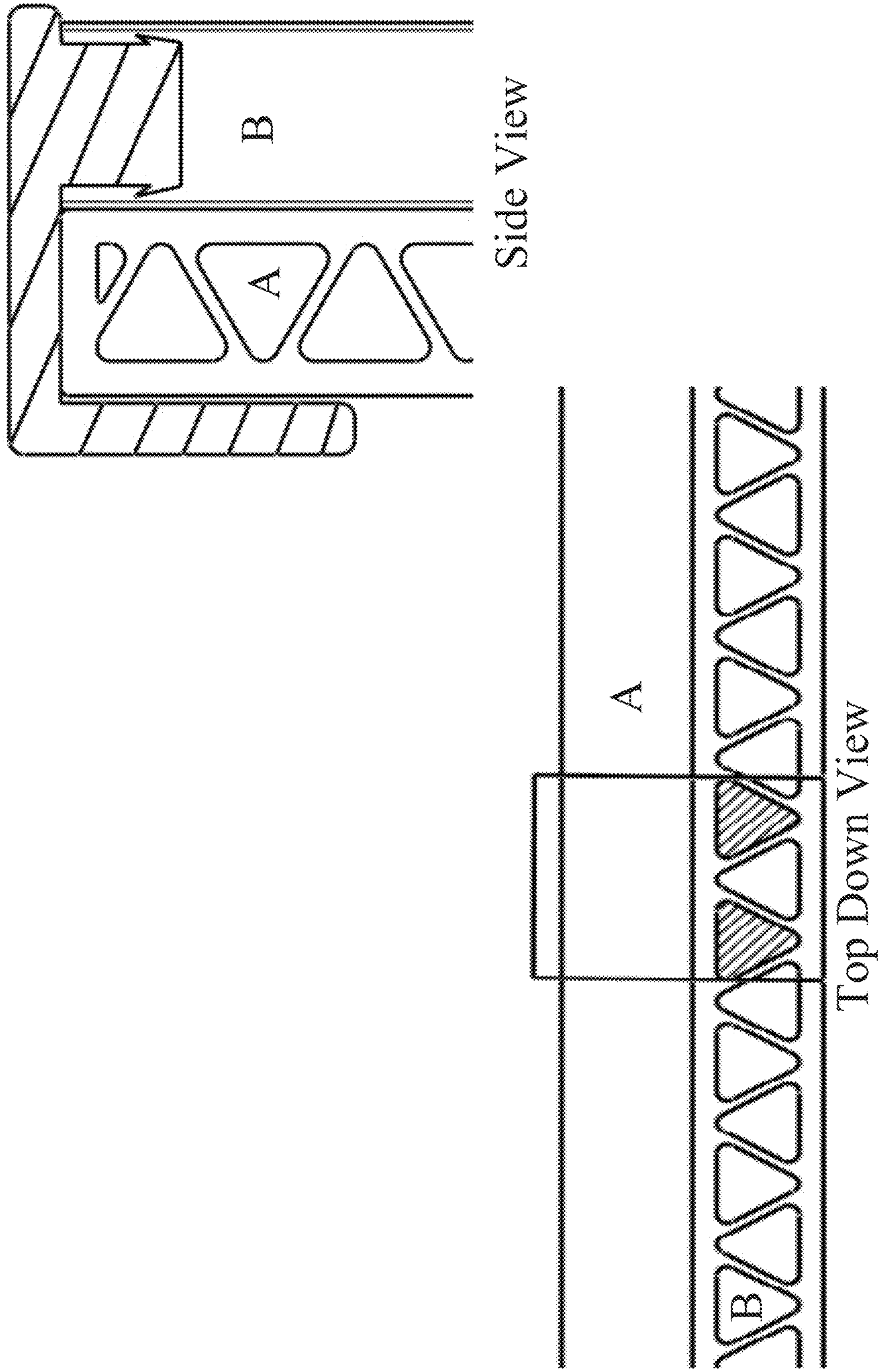
FIG. 42 illustrates an apparatus and method for clipping two or multiple boards together in a perpendicular fashion.
Figure 43:
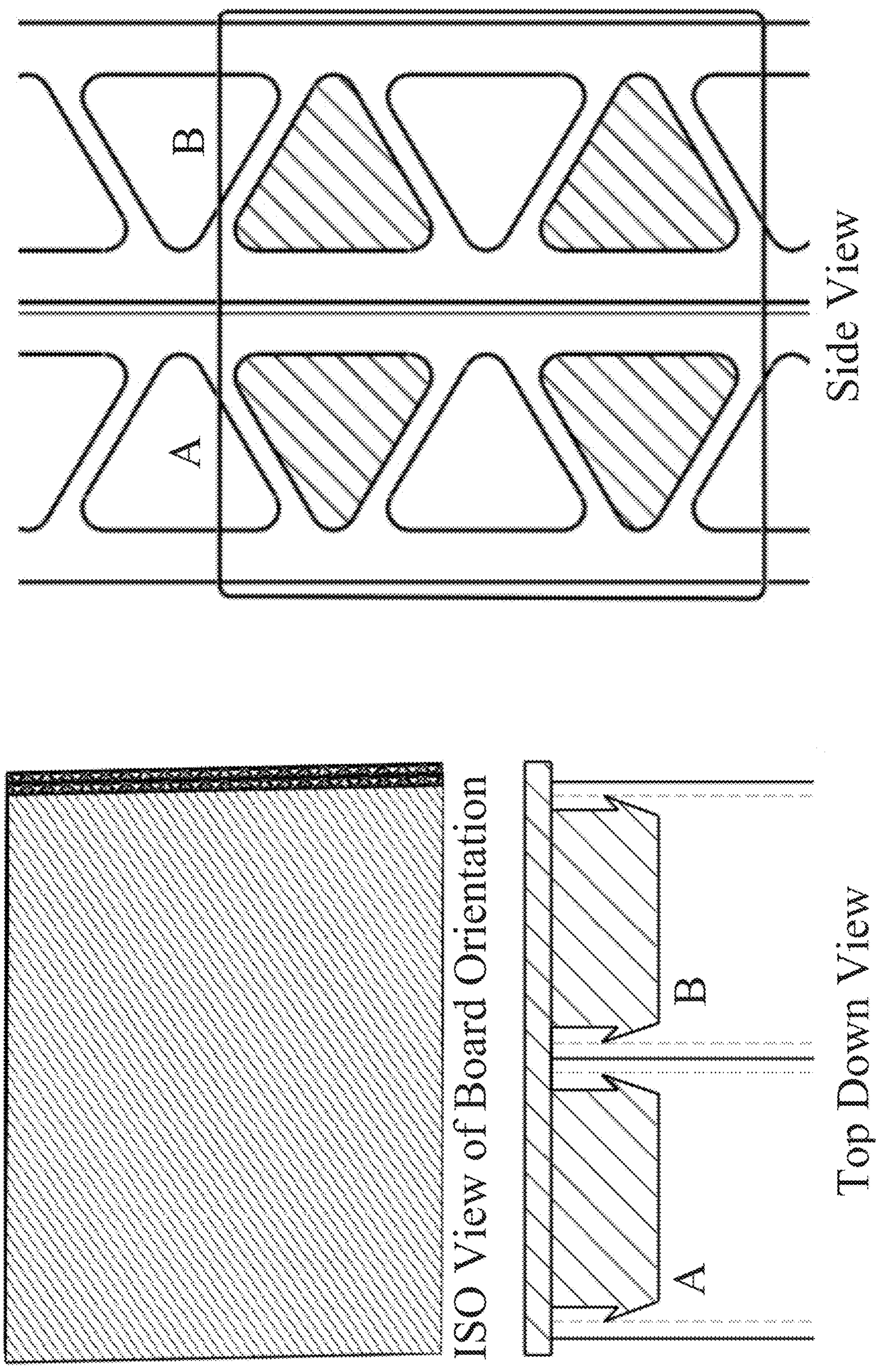
FIG. 43 illustrates an apparatus and method for clipping two or multiple boards together in a parallel fashion.
Figure 44:
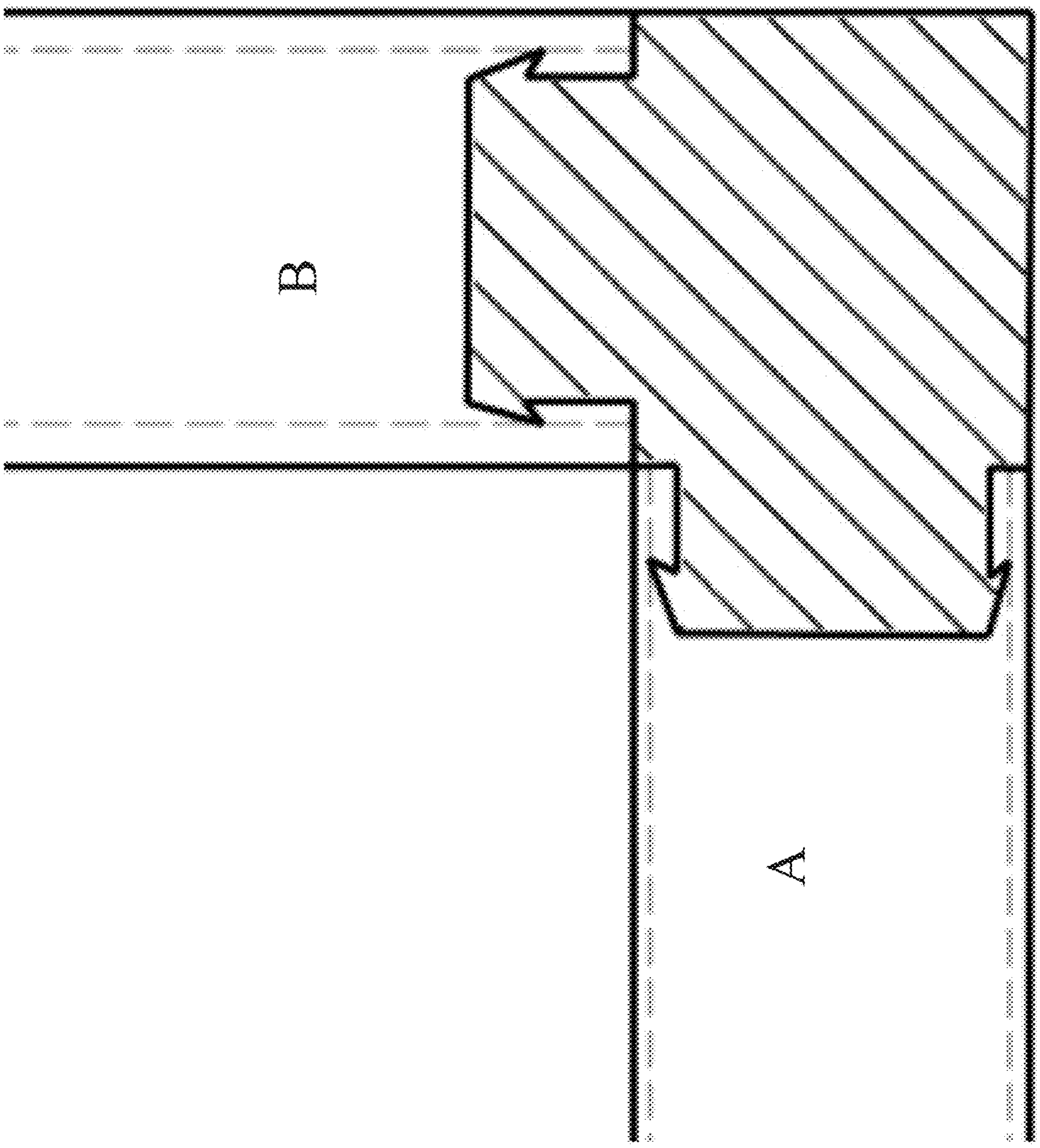
FIG. 44 illustrates an apparatus and method for clipping two or multiple boards together in a perpendicular corner fashion.

Modularity—The hollow core structure concrete form board enables the boards to be inter-connected and linked to allow multiple boards to be used in a case by case application, thereby removing the need to order or stock form boards with different thicknesses to achieve performance requirements. Using the void structure on each extruded form board, boards can be connected end to end, perpendicularly, or at corners by means of connectors while maintaining flatness across all form boards. FIG. 42 illustrates an apparatus and method for clipping two or multiple boards together in a perpendicular fashion. In an example embodiment, the extruded direction is 90 degrees relative to each board. In the example shown, a locking clip locks to board B while board A is retained. FIG. 43 illustrates an apparatus and method for clipping two or multiple boards together in a parallel fashion. In an example embodiment, the extruded direction is in the same direction relative to each board. In the example shown, a locking clip locks both boards together on their ends. Clips can use multiple void structures, or be reduced to only two. FIG. 44 illustrates an apparatus and method for clipping two or multiple boards together in a perpendicular corner fashion. In an example embodiment, the extrusion directions are rotated 90 degrees relative to each board. In this example shown, a clip can retain the core structure voids of each board, two or more, to form a corner structure.

Textured Concrete Form Boards—Using the extrusion and fabrication techniques described herein, extruded concrete form boards can be rolled and pressed with various customized design patterns, which get transferred to the formed material as the designed form boards make contact with the formed material. Such fabrication processes for pressing design patterns into the extruded boards are described above in connection with FIGS. 7 and 8.

Additionally, the extruded concrete form board fabrication process disclosed herein can be modified to use a bio-compostable material for the extruded concrete form board and accessories (e.g., stakes, connectors, etc.) In this example embodiment, the formwork can be left in place after the formed material is added to the formwork and cured. The bio-compostable formwork simply disintegrates after a pre-determined amount of time after forming and the formed material curing has occurred. As a result, concrete form boards no longer require cleanup, removal, repair, and transport.

Pressurized Extrusion

In another example embodiment, the hollow core structure of the extruded recycled construction materials can be to pressurize, apply a vacuum, or fill the hollow core voids with foam or other flowable material. Typically, this is not achievable because of the nature of hollow core extrusions. In this example embodiment, a section of the extrusion is pressed into itself by a pulling table, in order to create a "closed" extrusion. In all extrusions, the hollow core void structure is open to atmosphere, and it is not possible to interrupt the continuous flow of material. Once the pulling table presses the extrusion together, and keeps the extrusion formed until leaving the pulling table, the internal void structure can be pressurized, put under a vacuum, or filled with foam or other flowable material; because, the closed end section is no longer open to the atmosphere. In one example, a highly pressurized inner void structure (previously only under atmospheric pressure) can be created to form the material with high pressure against the tooling dies. This will increase the forming of the material and increase material performance. Upon pressurizing a given section of extrusion and a given length, the next set of pulling table rollers can press the next section of extrusion. Upon entering a cutting table, the pressed section of the extrusion can be cut out and re-used as feedstock. Pressurizing the inner void structure, post extrusion would not yield the same results as the material would have cool, settled, and already aligned itself molecularly.

Figure 49:
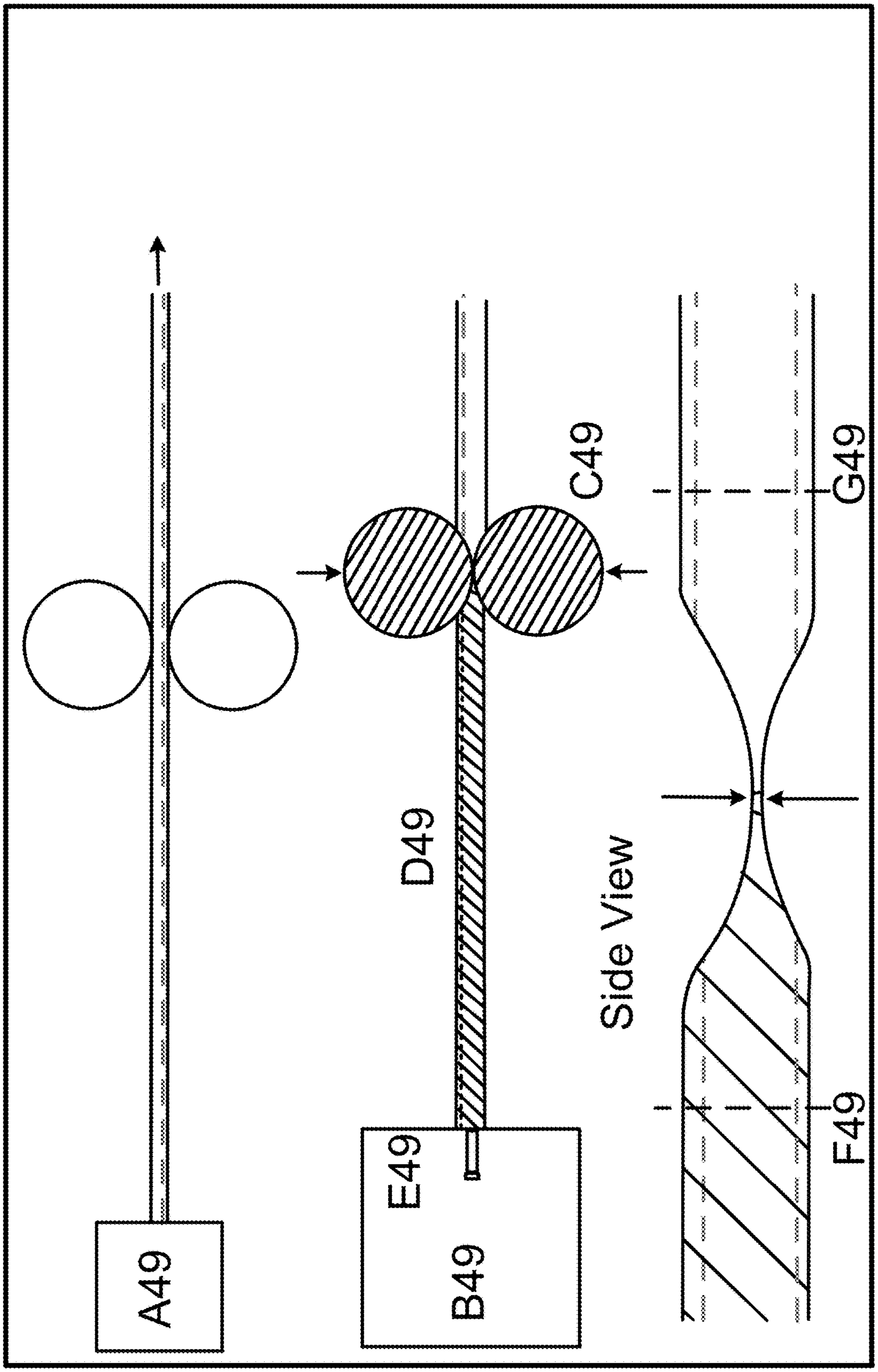
FIG. 49 illustrates an apparatus and method for forming an extrusion line with a hollow core for pressurized voids.

FIG. 49 illustrates an apparatus and method for forming an extrusion line with a hollow core for pressurized voids. Example A49 illustrates an arbitrary extrusion line with a hollow core. The outside faces can be formed, pulled with a vacuum, or the like. The hollow cores in this example are at atmospheric pressure. Example B49 illustrates an arbitrary extrusion line with a hollow core. The pressing devices C49 can be rollers, presses, part of a pulling system, or the like. The pressing devices C49 compress the part into a solid core, and remain there while section D49 can be pressurized, filled with foam or other flowable materials, or the like via a port at E49 (or ports in the case of the deck board or board). Once a desired pressurized length is reached, the compressed section can be cut at section F49 and G49, and recycled and re-ground.

Figure 50:
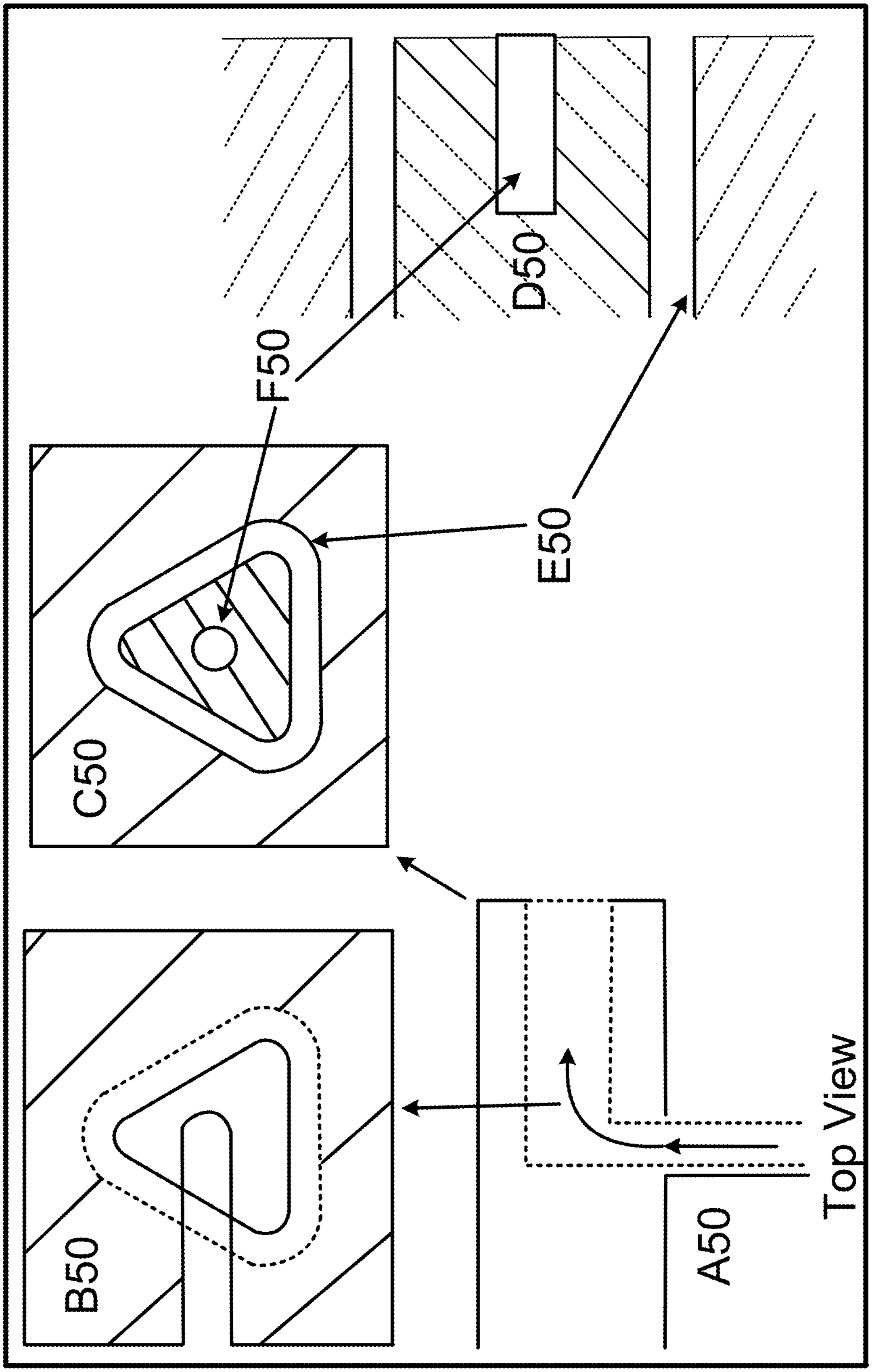
FIG. 50 illustrates an apparatus and method for fabricating an extrusion die for hollow core support.

FIG. 50 illustrates an apparatus and method for fabricating an extrusion die for hollow core support. Example A50 illustrates a top-down view of an arbitrary extrusion die hollow core support. This can be multiplied and extended to fit the end profile design. In section A50, a hollow support section is added to allow access to pressurize the internal hollow structure. Example B50 illustrates a section view of this extrusion die showing the hollow part that is otherwise normally a solid cross section. Section C50 shows the very end section of the extrusion die with E50 being the actual extruded part profile and F50 being the new hollow die section allowing a pressurization port. Section D50 is another further cut.

Deck Board System

In another example embodiment, the extruded recycled construction material techniques described herein can be used for the fabrication of deck boards. Typically, deck boards are customer facing products (e.g., not covered up in use) and are environmentally exposed. Because deck boards are customer facing products, appearance and neatness are of high importance. The extruded deck boards disclosed herein can be fabricated with a high degree of precision and therefore maintain an appealing appearance and neatness. In various example embodiments, a variety of deck board joining methods are disclosed to ensure a consistent, datum driven, and poke-yoke connection and fastening design in the deck board structure to achieve an even or adjustable gap between the deck boards. Because of the material composition and the methods used in the extrusion processes described herein, a deck board can be fabricated with increased spans, or a more "sturdy" feeling underfoot, while weighing less than traditional deck boards.

Figure 45:
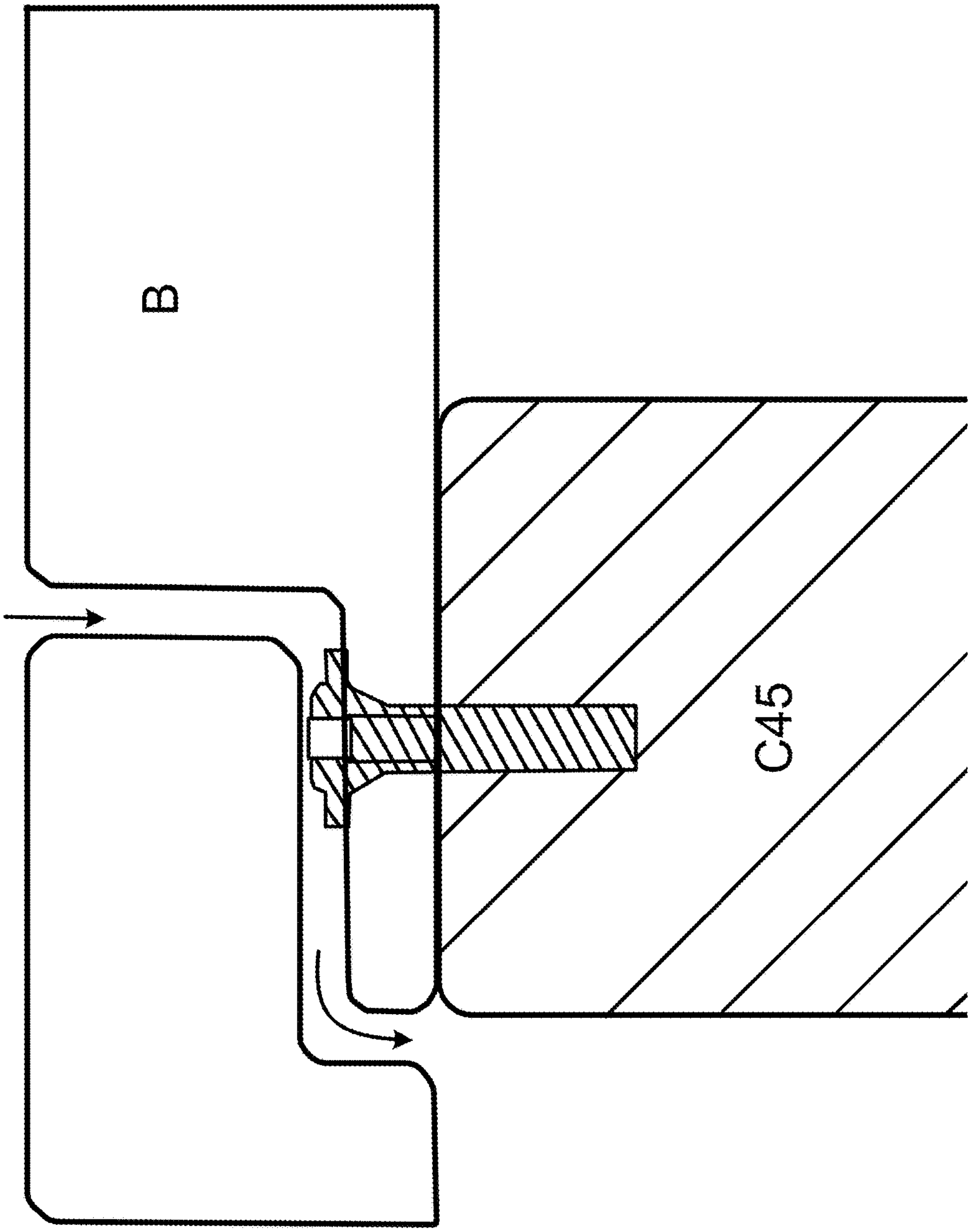
FIG. 45 illustrates an apparatus and method for fabricating a deck board with a gap to allow water or other fluids to pass through the gap.

FIG. 45 illustrates an apparatus and method for fabricating a deck board with a cross section as shown in the extruded direction to allow water or other fluids to pass through a gap, which can protect the underlying support structure (C45) from moisture.

Figure 46:
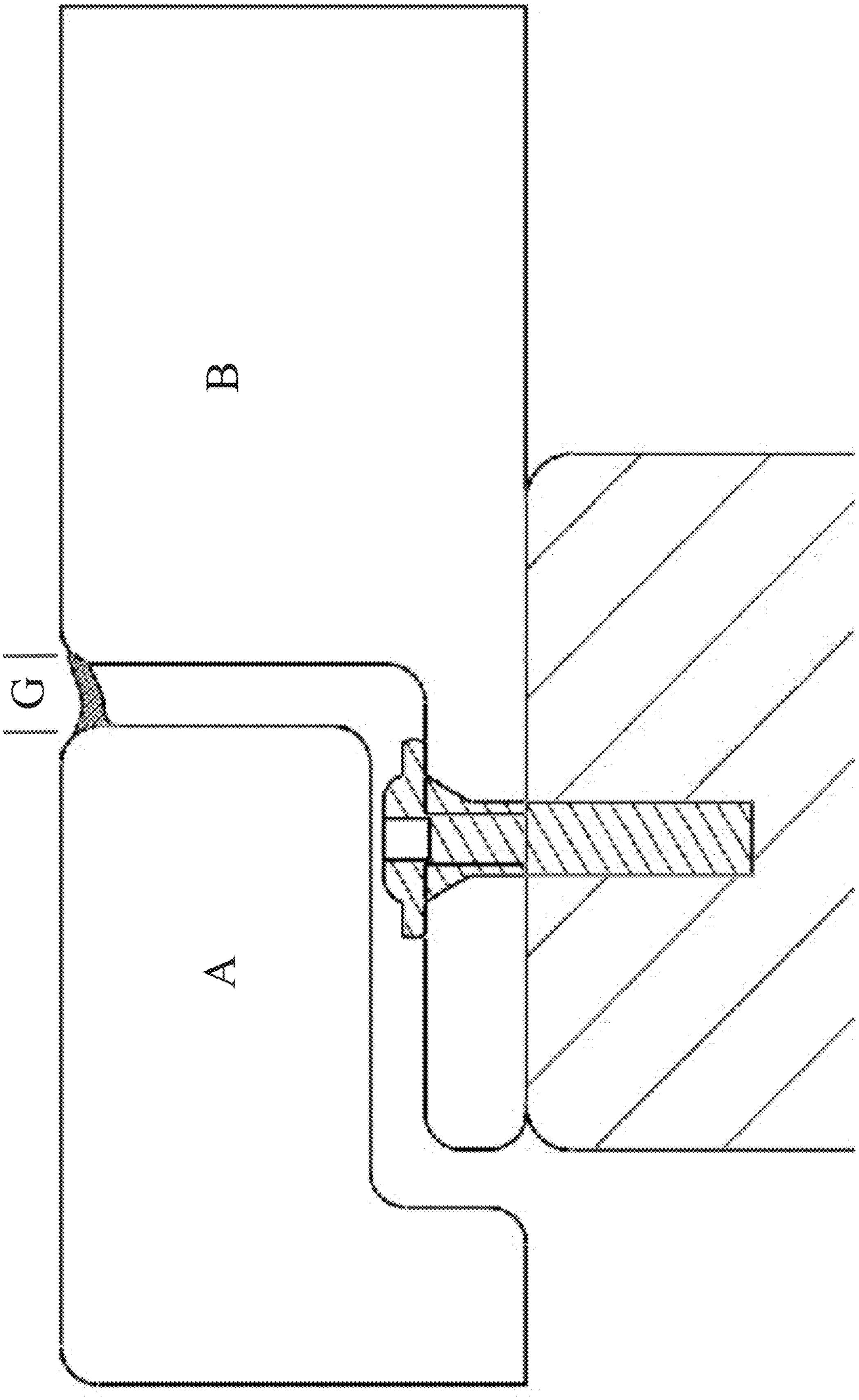
FIG. 46 illustrates an apparatus and method for fabricating a deck board with a co-extruded rubber seal to set a gap.

FIG. 46 illustrates an apparatus and method for fabricating a deck board, with a cross section as shown in the extruded direction, to include a co-extruded rubber seal to set the gap width (G), and to prevent water or other elements from entering the gap upon installation and for the lifetime of the deck board assembly.

Figure 47:
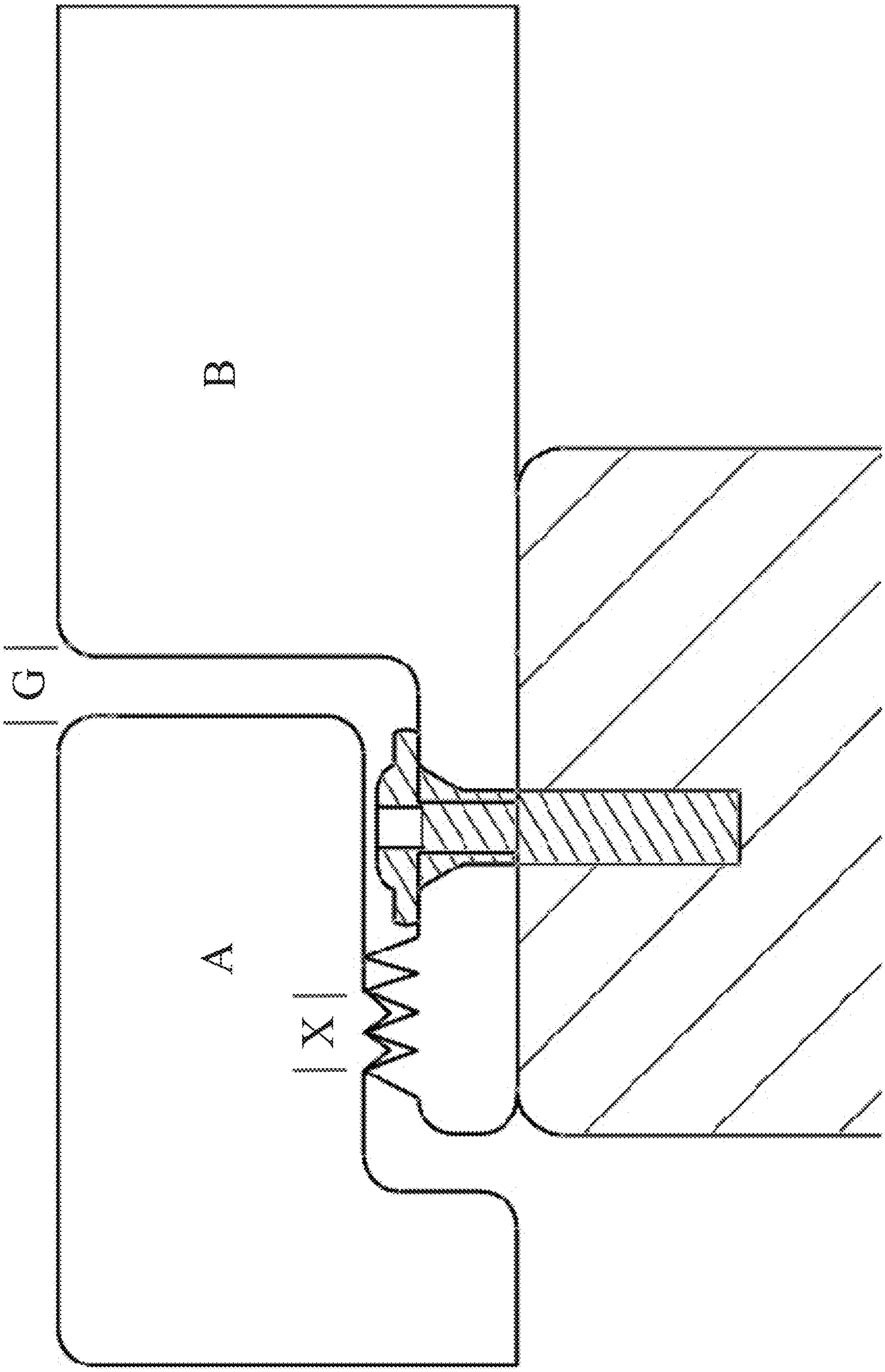
FIG. 47 illustrates an apparatus and method for fabricating a deck board with an extruded gap setting adjustment feature.

FIG. 47 illustrates an apparatus and method for fabricating a deck board, with a cross section as shown in the extruded direction, to include an extruded gap setting adjustment feature (with teeth in the example embodiment shown). The extruded gap setting adjustment feature shown allows the gap (G) to be adjusted incrementally and consistently upon installation without the need to rely on external features. A tooth of the extruded gap setting adjustment feature, of the example embodiment shown, with width (X) can allow for common adjustment increments.

Figure 48:
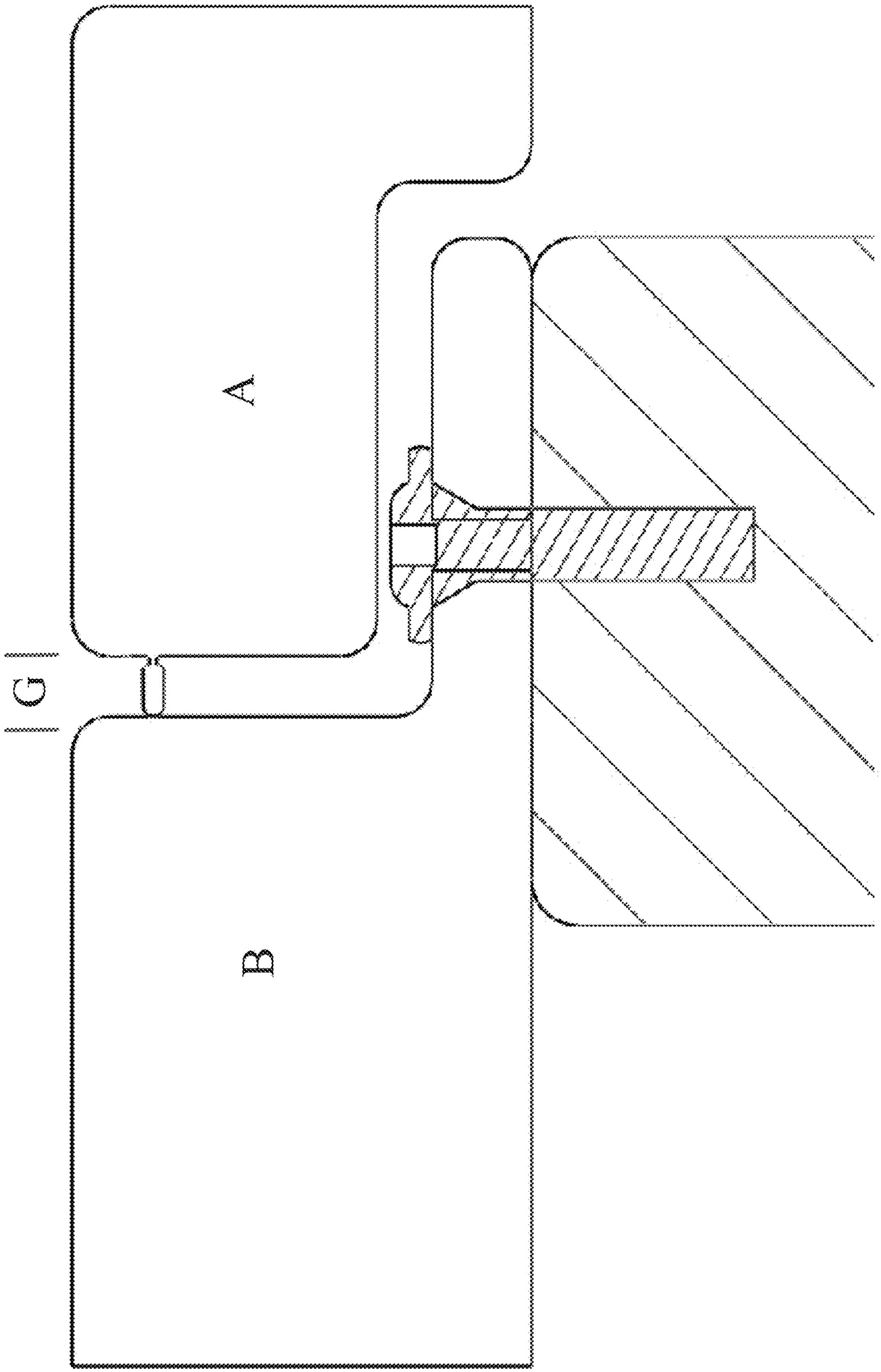
FIG. 48 illustrates an apparatus and method for fabricating a deck board with an extruded gap setting adjustment feature in the form of a breakable rib.

FIG. 48 illustrates an apparatus and method for fabricating a deck board, with a cross section as shown in the extruded direction, to include an extruded gap setting adjustment feature (with a breakable rib in the example embodiment shown). The extruded gap setting adjustment feature as shown allows the gap (G) to be precisely set and consistently maintained upon installation. After installation, the breakable rib can remain, thereby creating a different appearance relative to traditional designs. Alternatively, the breakable rib can be broken with a roller wheel to create a pass-through gap (G).

In various alternative embodiments, deck boards can be fabricated using the extrusion techniques described herein with internal voids or hollow cores to achieve a variety of end uses. For example, end cap connectors can be fitted to attach and lock into place in the voids at the ends of deck boards. Deck boards with hollow cores can be used to run wires or connectors through the voids in the deck boards to implement heated decks or decks with transparent extrusion lighting. Additionally, compostable or decomposing deck board gap wedges or ribs can be produced or co-extruded on the deck board profile to set a gap by use of a wedge or rib fabricated from de-compostable material. The wedge or rib allows the gap between deck boards to be consistent. When the wedge or rib fabricated from de-compostable material decomposes, the gap between deck boards remains consistent without the presence of the wedge or rib.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, construction components and systems fabricated using extruded materials are disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A method for forming a sheet, the method comprising:

extruding, through an extrusion die, a heated thermoplastic material to form the sheet, wherein the sheet comprises a first side, a second side, and a series of voids disposed between the first side and the second side, wherein each void in the series of voids comprises a triangular shape and is arranged in an alternatingly inverted pattern, wherein each vertex of the triangular shape is configured with a rounded corner, and wherein the sheet has a length in an x-direction, the x-direction being the direction of extrusion, a width in a y-direction, and a thickness in a z-direction; and injecting, into the extrusion die and during the extruding, a foam distinct from the thermoplastic material such that each void in the series of voids is at least partially filled with foam as the heated thermoplastic material exits the extrusion die.

2. The method of claim 1, wherein the thermoplastic material is monolithic throughout the sheet.

3. A method for forming a sheet, the method comprising:

extruding, through an extrusion die, a heated thermoplastic material to form the sheet, wherein the sheet comprises a first side, a second side, and a series of voids disposed between the first side and the second side, wherein each void in the series of voids comprises a triangular shape and is arranged in an alternatingly inverted pattern, wherein each vertex of the triangular shape is configured with a rounded corner, wherein the sheet has a length in an x-direction, the x-direction being the direction of extrusion, a width in a y-direction, and a thickness in a z-direction, and wherein the thermoplastic material is monolithic throughout the sheet;

forming a regular pattern of fastening slots extending along the sheet in the x-direction, wherein each fastening slot is positioned atop a corresponding triangular void to create a self-aligning guide that facilitates accurate fastener installation; and forming a series of raised anti-slip features extending along the sheet in the x-direction.

4. The method of claim 1, wherein the thermoplastic material comprises about 50 percent glass fiber and about 50 percent plastic.

5. The method of claim 3, further comprising cutting the sheet to form a panel.

6. The method of claim 5, wherein the panel has a width of 4 feet and a standard construction length.

7. A method for forming a sheet, the method comprising:

extruding, through an extrusion die, a heated thermoplastic material to form the sheet, wherein the sheet comprises a first side, a second side, and a series of voids disposed between the first side and the second side, wherein each void in the series of voids comprises a triangular shape and is arranged in an alternatingly inverted pattern, wherein each vertex of the triangular shape is configured with a rounded corner, and wherein the sheet has a length in an x-direction, the x-direction being the direction of extrusion, a width in a y-direction, and a thickness in a z-direction;

inserting, through the extrusion die and during the extruding, electrical wiring such that the electrical wiring extends along one of the series of voids as the heated thermoplastic material exits the extrusion die.

8. A method for forming a sheet, the method comprising:

extruding, through an extrusion die, a heated thermoplastic material to form the sheet, wherein the sheet comprises a first side, a second side, and a series of voids disposed between the first side and the second side;

pressing the sheet in a first location and in a direction perpendicular to the direction of the extruding to close a first end of each void of the series of voids;

pressurizing each void in the series of voids above ambient pressure; and pressing the sheet in a second location and in the direction perpendicular to the direction of the extruding to close a second end of each void of the series of voids to form a pressurized sheet.

9. The method of claim 8, wherein the thermoplastic material comprises 100% recycled plastic.

10. The method of claim 8, wherein the thermoplastic material comprises plastic and fibers.

11. The method of claim 10, wherein the fibers comprise at least one of hemp, fiberglass, or carbon fiber.

12. The method of claim 10, wherein the thermoplastic material comprises about 50 percent glass fiber and about 50 percent plastic.

* * * * *